(12) United States Patent
Das Sharma et al.

(10) Patent No.: US 11,327,861 B2
(45) Date of Patent: *May 10, 2022

(54) CROSS-TALK GENERATION IN A MULTI-LANE LINK DURING LANE TESTING

(71) Applicant: Intel Corporation, Santa Clara, CA (US)

(72) Inventors: Debendra Das Sharma, Saratoga, CA (US); Daniel S. Froelich, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,946

(22) Filed: Nov. 30, 2020

(65) Prior Publication Data

US 2021/0081288 A1    Mar. 18, 2021

Related U.S. Application Data

(63) Continuation of application No. 15/990,372, filed on May 25, 2018, now Pat. No. 10,853,212.

(60) Provisional application No. 62/614,874, filed on Jan. 8, 2018.

(51) Int. Cl.
*G06F 11/00* (2006.01)
*G06F 11/22* (2006.01)
*G06F 13/42* (2006.01)

(52) U.S. Cl.
CPC ........ *G06F 11/221* (2013.01); *G06F 13/4282* (2013.01); *G06F 13/4295* (2013.01); *G06F 2213/0026* (2013.01)

(58) Field of Classification Search
CPC .......... G06F 11/221; G06F 2213/0026; G01R 31/021; G01R 31/08
See application file for complete search history.

(56) References Cited

U.S. PATENT DOCUMENTS

| | | | |
|---|---|---|---|
| 9,536,626 | B2 | 1/2017 | Schoenborn et al. |
| 2002/0123350 | A1 | 9/2002 | Bui |
| 2004/0204912 | A1 | 10/2004 | Nejedlo et al. |
| 2013/0103927 | A1 | 4/2013 | Berry, Jr. et al. |
| 2014/0229666 | A1 | 8/2014 | Schoenborn et al. |
| 2019/0049504 | A1 | 2/2019 | Amarasinghe et al. |

*Primary Examiner* — Michael Maskulinski
(74) *Attorney, Agent, or Firm* — Alliance IP, LLC

(57) ABSTRACT

A port of a computing device includes multiple receiver-transmitter pairs, each of the receiver-transmitter pairs including a respective receiver and a respective transmitter. The device further includes state machine logic that detects a training sequence received by a particular one of the receiver-transmitter pairs on a particular lane from a tester device. The training sequence includes a value to indicate a test of the particular receiver-transmitter pair by the tester device. The particular receiver-transmitter pair enters a first link state in association with the test and one or more other receiver-transmitter pairs of the port enter a second link state different from the first link state in association with the test to cause crosstalk to be generated on the particular lane during the test.

19 Claims, 14 Drawing Sheets

CROSS-TALK GENERATION IN A MULTI-LANE LINK DURING LANE TESTING

RELATED APPLICATIONS

This application is a continuation of U.S. patent application Ser. No. 15/990,372, filed May 25, 2018, which claims the benefit of priority to U.S. Provisional Patent Application Ser. No. 62/614,874, filed Jan. 8, 2018, the disclosures of which are incorporated by reference herein in their entirety.

FIELD

This disclosure pertains to computing system, and in particular (but not exclusively) to testing systems for point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. Servers may also be implemented using distributed computing, in rack scale architectures, and other alternative implementations. As the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

DETAILED DESCRIPTION

Figure 1:
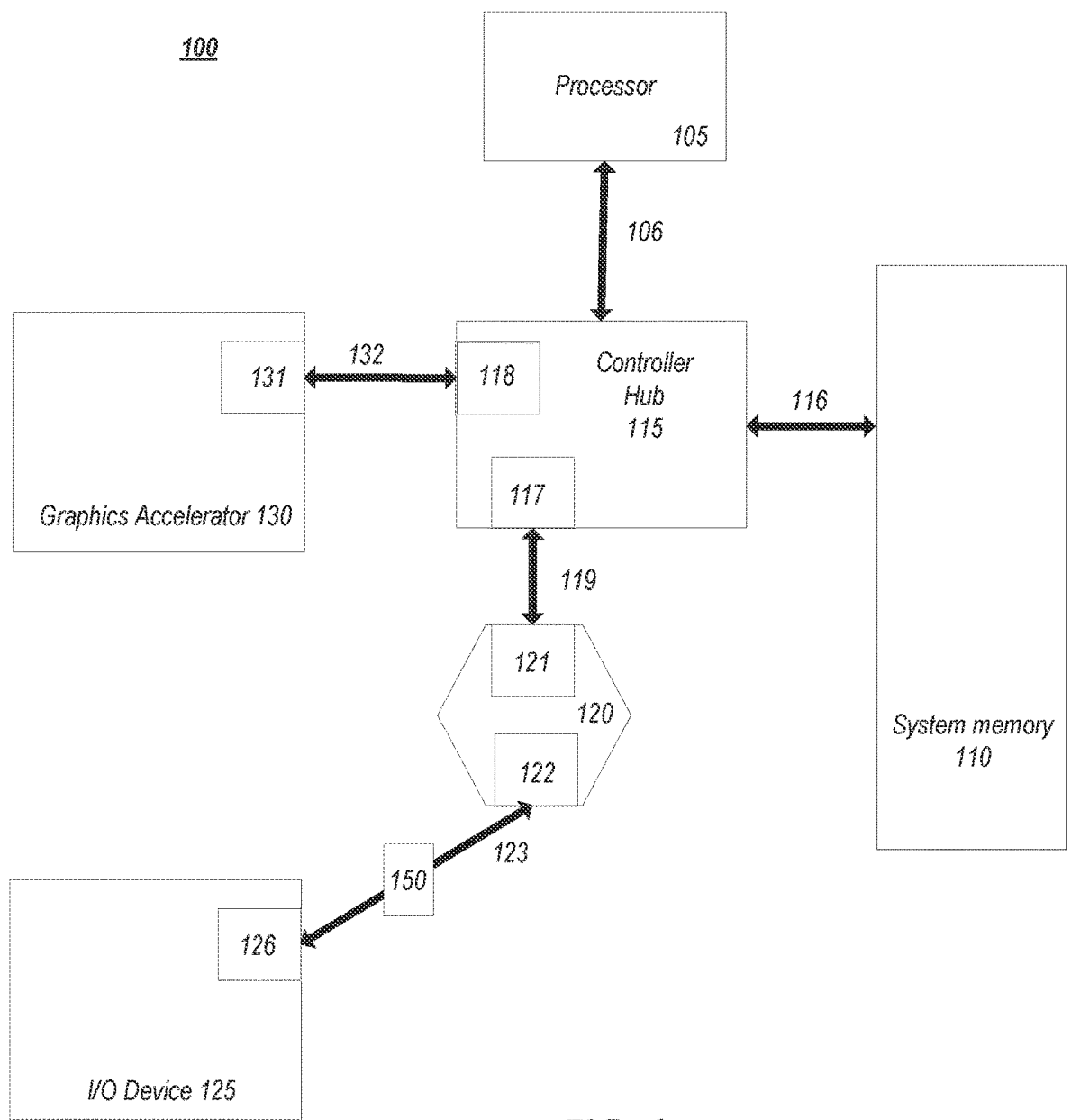
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, Cloud, Fog, Enterprise, etc.), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
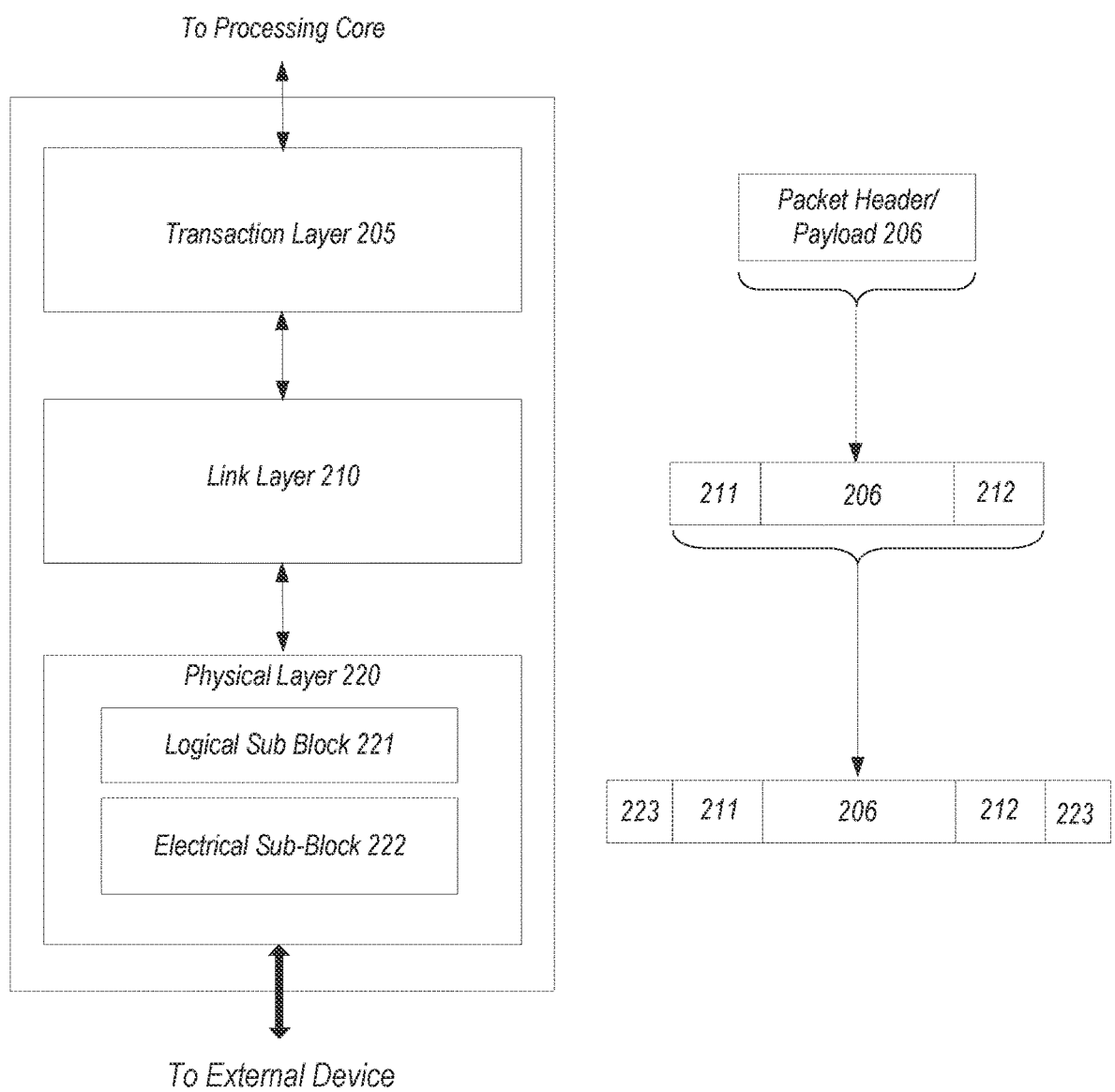
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
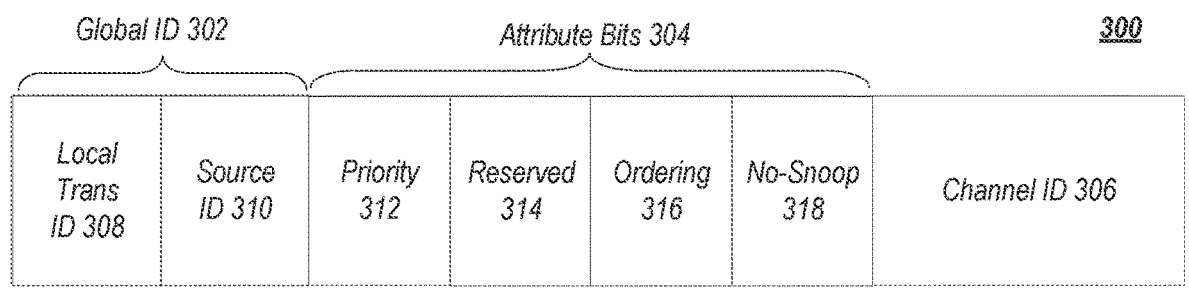
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
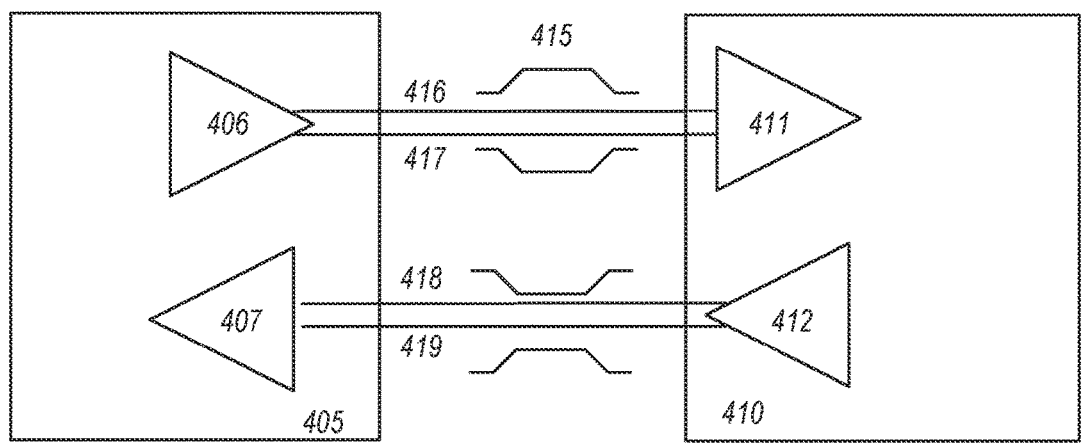
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

Figure 5:
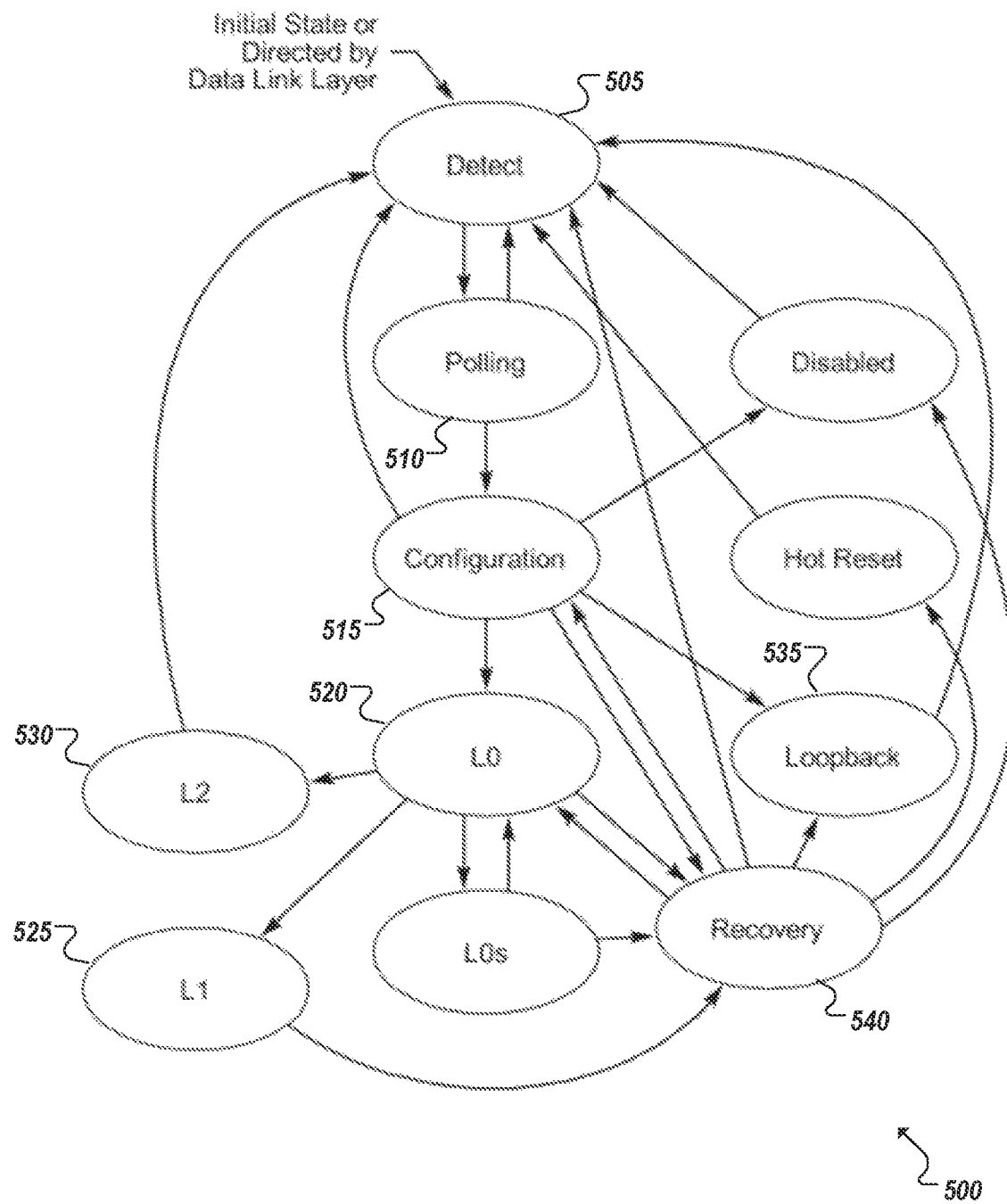
FIG. 5 is a diagram illustrating an example link training state machine.

Turning to the diagram 500 of FIG. 5, an example link training state machine is shown, such as the PCIe link training and status state machine (LTSSM). Transitions between the various link states may be defined, including the signaling that is to take place to notify the other system on the link or to complete a handshake between the interconnected devices to request, negotiate, and/or confirm the transition from on state to the next in order to reach an active, transmitting link state (e.g., L0 (520)). For instance, some state transitions may be defined to involve the sending and receiving of training set (TS) ordered sets (OSes). In an implementation utilizing PCIe as the PHY protocol, the TS ordered sets may include a TS1 and a TS2 ordered set, among other example ordered sets. The ordered sets and training sequences sent during link training may be based on the particular link training state, with various link training states utilized to accomplish corresponding link training activities and objectives.

In one example, such as illustrated in FIG. 5, a link training state machine 500 may include such states as a Reset state, a Detect state 505 (e.g., to detect a far end termination (e.g., another device connected to the lanes), a Polling state 510 (e.g., to establish symbol lock and configure lane polarity), a Configuration (or "Config") state 515 (e.g., to configure the physical lanes of a connection into a link with particular lane width, lane numbering, etc., performing lane-to-lane deskew and other link configuration activities), a Loopback state 535 (e.g., to perform testing, fault isolation, equalization, and other tasks), a Recovery 540 state (e.g., for use to change the data rate of operation, re-establish bit lock, Symbol lock or block alignment, perform lane-to-lane de-skew, etc.) among other states (e.g., low power states L1 (525) and L2 (530)), which may be utilized to bring the link to an active link state (e.g., L0 (520)). In one example, training sequences to be sent in a particular one (or more) of the link training states (e.g., illustrated in the example of FIG. 5) may be defined to accommodate the negotiation of a particular one of the supported protocols of a particular device. For instance, the particular training state may be a training state preceding entry into an active link state (e.g., 520), or a training state in which the data rate may be upscaled (e.g., beyond that supported by at least one of the supported protocols), such as a PCIe state where a data rate transitions from a Gen1 speed to Gen3 and higher speeds, among other examples.

In some implementations, additional link states may be defined (and corresponding hardware circuitry and other logic implemented on devices compatible with the interconnect protocol) to support testing of ports on the device. For instance, additional states may be defined, which may be entered to support testing of individual lanes (i.e., the hardware and logic by which the device is to send and receive data on a given bidirectional lane). In such instances, a link state machine (such as the example link state machine introduced in FIG. 5) may be augmented to allow state transitions to deviate from those expected in training a link to a default, or standard operational state, to allow the lane to be tested to transition to a first state, while other lanes of the multi-lane link to be transitioned to a different state to support the testing of the lane under test.

In some instances, traditional tester devices, such as traditional BERTs, may only test a single lane and devices may be programmed or designed (for various reasons) to limit the lanes which may be tested. For instance, traditional PCIe BERTs may only be able to test Lane 0 of PCIe devices (e.g., due to other, competing transmitter equalization considerations) and may be further limited in being able to only use existing PCIe LTSSM transitions. For instance, a traditional BERT may train the DUT to L0 (e.g., resulting in a Lane 0 dependency), performs equalization through Recovery, transition from Recovery to Loopback (with the BERT as master), and then proceed with the test of the receiver.

Additionally, in some traditional implementations, a tester may not use or cause real (near-end or far-end) cross-talk to be generated from the other lanes (not under test), but may rather model hypothetical (and in many cases, worst case) cross-talk (e.g., combined near-end and far-end crosstalk) using an approximation in the BERT to artificially inject extra noise into the signals sent on the lane under test during the test. However, with interconnects being designed to handle increasing data rates such as 32.0 GT/s (e.g., PCIe Gen4), it may be more critical to test for precise package- and channel-introduced cross-talk by accurately capturing real cross-talk resulting from the actual design of the package instead of relying on approximations as higher data rates allow decreasingly small margins for error. In some cases, multi-lane BERTs may be provided, which may simplify test implementations involving more than one lane at a time, but such system may be prohibitively expensive in some applications. A link training state machine (such as that illustrated in the example of FIG. 5) may be instead augmented, and corresponding logic provided in a compliance device, to allow for a more cost-effective and precise approach using traditional single-lane BERT designs. Indeed, in some implementations, not only can far-end cross talk (FEXT) be captured (e.g., the cross-talk resulting from the transmissions of a remote device to the device under test), but near-end cross-talk (NEXT) (e.g., the cross-talk resulting from the transmissions of lanes other than the victim lane (e.g., the lane under test) on the device under test). For instance, these new test-enabling link states may allow NEXT to be captured from the other transmitters on the DUT and/or allow FEXT to be captured by allowing signals to be sent to the receivers on other lanes on the device other test while the lane under test remains in loopback and other states during testing by the BERT, among other example benefits and implementations.

In some implementations, link state logic may be augmented to support not only a default or standard link state machine and transitions between states defined in the standard link state machine, but may also support specialized test states, which may allow individual lanes of a multi-lane link to be tested using a test device (e.g., an on-die margining tester, a standalone bit error rate tester (BERT) device, etc.), while other lanes of the link generate far-end and/or near end cross-talk. Using these specialized state and state machine transitions, far-end cross-talk (or FEXT) and near-end cross-talk (or NEXT) may be generated on the lanes not under test to accommodate precision testing of the lane (or, in the case of multi-lane testers, lanes) under test. While traditional lane testing involved the injection of artificial, or simulated, noise on data of the lane being tested, such simulated noise is typically cast to model worst case scenarios, which may ignore the actual features of the port being tested (e.g., which may be equipped with circuitry and components to assist in minimizing crosstalk on the device (making tests using simulated worst-case cross-talk overly pessimistic and unrealistic)). Accordingly, in some cases, specialized testing link states may enable more realistic margin information at higher data rates (such as PCIe Gen 5 at 32.0 GT/s), as opposed to the traditional approaches relying on emulated cross-talk.

In some implementations, a standard, or default, link training state machine defined for an interconnect may be augmented to support specialized testing link states, which may enable a port to train a link such that different lanes of the link enter different states to allow some lanes to be tested (e.g., by running the lane through link training and link state transitions expected in or defined for default operation), while other lanes enter one of potentially multiple different states to provide real (rather than synthesized) cross-talk and enable multiple, authentic testing modes. In one example, a link training algorithm may be augmented to identify and select one or more particular lanes of a link that are to be tested by a testing device, such as a BERT. The selected lane may be driven by the tester device during the test. The remaining lanes of the device under test (DUT) may be self-trained or be placed into an idle or other quiet state while the BERT drives link training and status state machine (LTSSM) changes on the lane it controls in connection with the test of the lane (or the lane under test (LUT)). In some implementations, the link may be placed into a loopback state, initiated by the tester device (e.g., through a specialized ordered set sent to the device under test by the tester device using the link). When the link goes to Loopback, in such an example, the DUT may drive (modified) compliance pattern in Loopback.Entry on all the other lanes or stay in transmitter electrical idle on all other lanes (i.e., the other lanes not under test) based on the training information sent by the tester device on the lane connected to the tester device. In this manner, the DUT itself may be used to generate cross-talk desired to completing a test of one more lanes (e.g., the corresponding receiver-transmitter pairs) of the DUT, while the tester device manages the specific lane it wants to test. Furthermore, the DUT may also be put in a state by the training with the tester device where all other receivers on the DUT may receiver traffic without impacting loopback on the lane under test by the tester device, among other examples, such as discussed below.

Figure 6A:
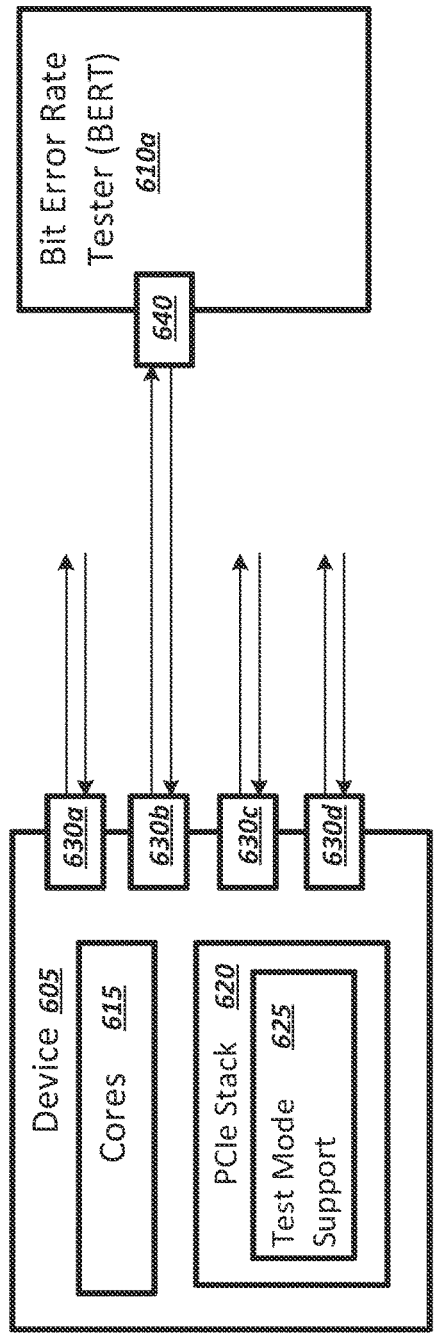
FIGS. 6A-6B are diagrams illustrating an example device connected to a tester device to conduct testing of a particular lane of a link.
Figure 6B:
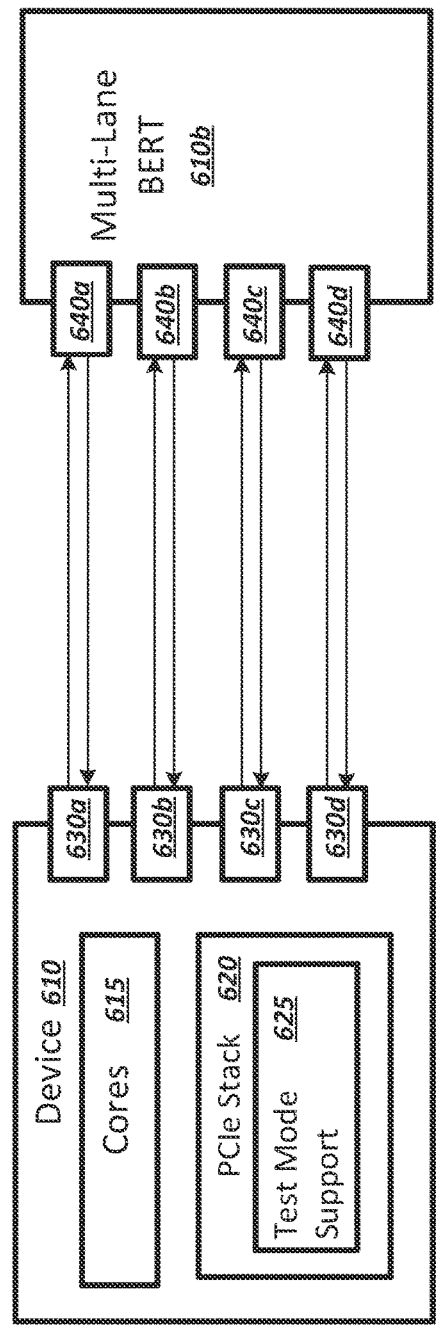

Turning to the simplified block diagrams 600*a-b* of FIGS. 6A-6B, example systems are shown including an example computing device (e.g., 605) and an example testing device (e.g., 610*a,b*). In the example of FIG. 6A, a single lane bit error rate tester (BERT) device 610*a* is shown, which may be used to connect to a single lane (e.g., 630*b*) of a device under test (e.g., 605) and perform various margining and other testing of the lane. In this example, the computing device 605 may include one or more data processing cores (e.g., 615) and/or other data processing circuitry, which may utilize a layered interconnect stack 620 (e.g., a PCIe, UPI, Ethernet, OpenCAPI, Gen-Z, or other layered interconnect stacks) to communicate with other devices over one or more interconnect links. The interconnect stack 620 may be implemented through logic circuitry and other hardware (as well as, or alternatively, using software- and/or firmware-implemented logic) to support and implement each one of the interconnect layers (e.g., physical layer, logical PHY, data link layer, transaction layer, protocol layer, etc.), including the generation and sending of units of data (e.g., packets, frames, flits, phits, etc.) defined for the interconnect. The interconnect stack 620 may further enable the port(s) of the device to enter and transition between various operational and link states defined for the interconnect, including link training and testing states with defined ordered sets, training sequences, handshakes, and other signaling defined to enable two interconnected devices to orchestrate the training and transmission of data on a link according to a corresponding interconnect protocol. Such logic may include state machine logic implemented at least partially in logic circuitry or other hardware of the computing device 605.

Continuing with the example of FIG. 6A, interconnect stack logic 620 may be augmented in some implementations to support additional test-specific link states and link state transitions, such as introduced in the discussion above. For instance, interconnect stack logic 620 implemented on the device 605 may include test mode support logic 625, implemented at least in part using hardware logic circuitry. The test mode logic 625 may enable additional testing link states as well as govern transitions to these test states and coordination of how the testing link states are applied on which lanes (e.g., 630*a-d*) during the test. Within the present disclosure, a "lane" may alternatively refer to the physical lanes which implement a link connecting two devices, or the respective receiver/transmitter pair and supporting logic (e.g., 630*a*-*d*) on a device (e.g., 605) which couples the device to a corresponding physical lane of the link.

In the example of FIG. 6A, a single lane BERT 610*a* is shown, which can couple to and test each one of a plurality of different lanes individually. Test mode logic 625 can enable the specific lane to be tested (e.g., 630*b*) to be identified and cause this lane under test (i.e., the receiver/transmitter pair of the port of the device 605 connected to the bidirectional lane coupling the device under test 605 to the BERT device 610*a*) to enter one of the testing link states (e.g., a loopback, active transmitting link state, a link training state, etc.) in connection with a test of the lane. In some cases, the BERT 610*a* may direct which link state(s) the lane under test enters during the test. During the test, the test mode logic 625 may identify one or more other lanes (i.e., other than the lane under test) that are to enter other testing link states to support the BERT device's testing of the lane under test. For instance, the test mode logic 625 may cause one or more (or all) of the lanes (e.g., 630*a,c,d*) other than the lane under test (e.g., 630*b*) to enter link states to enable these lanes to produce near-end and/or far-end cross-talk on the victim lane under test (e.g., 630*b*).

In some implementations, lanes other than the lane under test may remain unconnected, connected to a utility device (e.g., separate from, but supporting the BERT), or connected to the BERT itself. In some implementations, as shown in the example of FIG. 6B, a tester device (e.g., a multilane BERT device (e.g., 605*b*)) may be provided with multiple lanes (e.g., receiver/transmitter pairs) to connect to multiple lanes of a device under test. A multilane tester (e.g., 610*a-b*) may connect to each one of the lanes (e.g., 630*a-d*) of the device under test (605). A multi-lane tester may test each lane of the device under test serially, without any need for reconnection of the lanes. Additionally, the multi-lane tester may work in concert with the test mode logic 625 on the device under test 605 to assist in the generation of FEXT and NEXT on those lanes not currently under test using supporting testing link states, among other example implementations.

Figure 7:
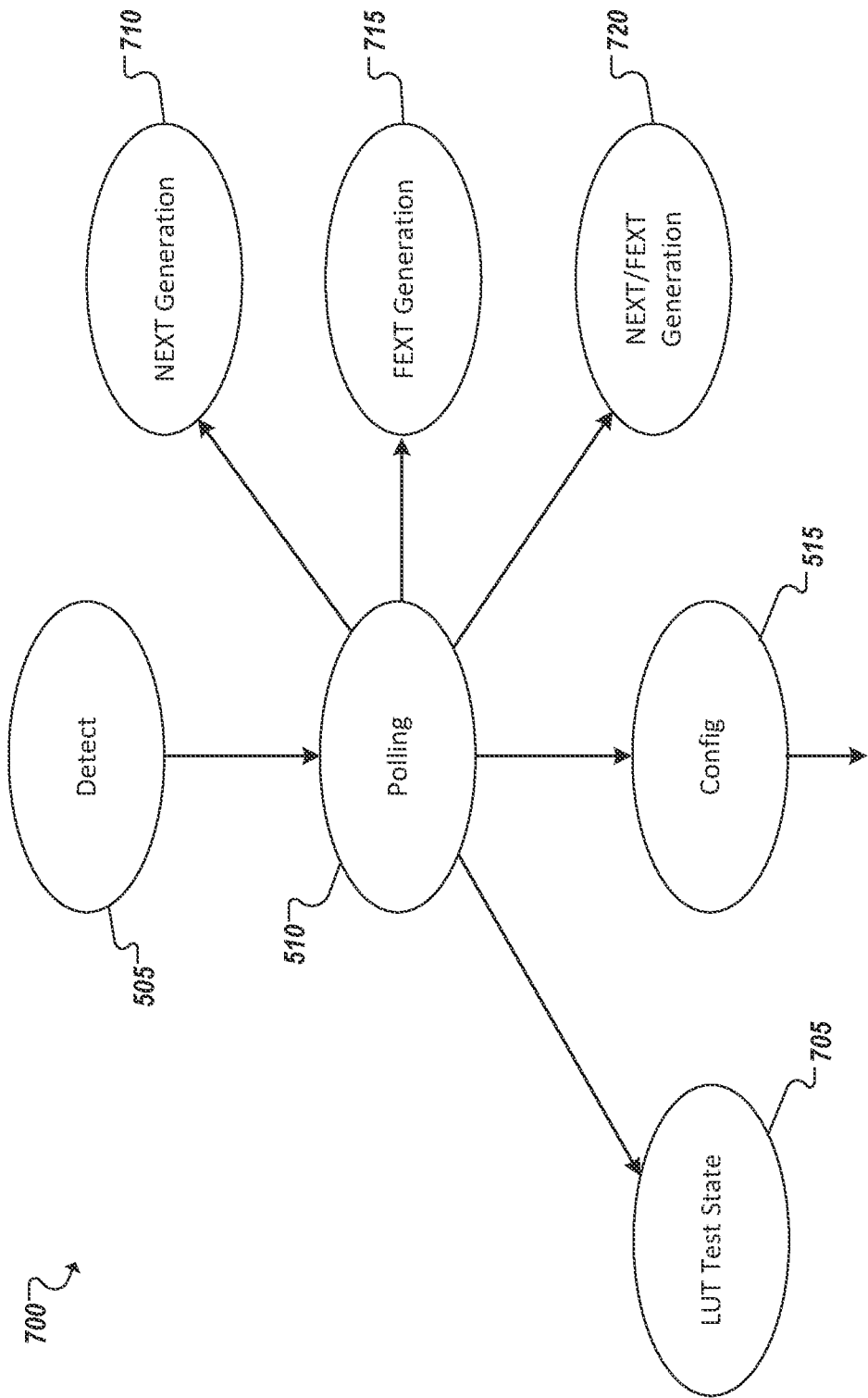
FIG. 7 is a diagram illustrating a portion of an example link training state machine including specialized testing link states.

Turning to the diagram 700 of FIG. 7, a simplified block diagram 700 is shown illustrated a portion of a diagram of an augmented link state machine showing specialized testing link states (e.g., 705, 710, 715, 720), which may be added to the state machine to facilitate testing of individual lanes of a link. For instance, in the example of FIG. 7, the augmented state machine may be an augmented version of a PCIe link state machine, such as introduced in the diagram 500 of FIG. 5. For instance, standard link states defined for the state machine (e.g., in accordance with a corresponding interconnect protocol) may include a receiver detect state (e.g., 505), polling state (e.g., 510), configuration state (e.g., 515), and potentially other link training states which may be entered and used prior to transitioning to active, transmitting, or operational link states (e.g., an L0 state (not shown), among other example states. During training of a link, various ordered sets, such as training sequences (e.g., PCIe TS1 or TS2 training sequences) may be sent, which may include fields which are encoded to provide information specific to the link training state and define various aspects of the link (e.g., lane numbering, deskew, synchronization, bit lock, configuration, etc.). In some implementations, a link may be trained effectively lane-by-lane, with each receiver-transmitter pair sending and receiving its own instances of the training sequences to configure and train each lane to the desired parameters to allow complete and reliable training of the overall link. As an example, symbol lock, bit lock, and block alignment may be accomplished on a per-lane basis, with the training sequences sent on each lane adapted for achieving the correct configuration for the lane. In some cases, ordered sets of a same type may be sent synchronously on each lane in the link (although values in each ordered set may vary from lane to lane), among other examples.

In the example of FIG. 7, one or more fields of training sequences sent during one or more of the link training states defined in standard states of a link state machine may be augmented to provide an indication that the device participating in the training is to enter a testing mode. For instance, bits in one or more symbols of a training sequence sent in a particular, defined state or substate of the state machine may be defined to communicate that the device is to be tested. Further, one or more bits or fields in a training sequence may be defined to indicate that a tester device (e.g., a BERT) is connected to one or more lanes of the link and that these lanes are to be tested. Further, one or more bits or fields of the same (or a different or subsequent instance of the) training sequence may be encoded with information to indicate that other lanes, not under test, should transition to other testing link states to assist in facilitating the testing of a particular lane. Moreover, in connection with the identification of a particular lane that is to be tested, a training sequence may be encoded to indicate that the particular lane to be tested is to enter another link state, consistent with the type of test that is to be performed, among other examples.

In one example implementation, a tester device may encode a training sequence sent during a polling state (e.g., 510) (or another particular link training state as defined in an interconnect protocol) to indicate that a particular lane of the link is to be tested and that other remaining lanes of the link are to transition to another testing link state to support the testing of the particular lane. Accordingly, rather than having all of the lanes transition together from the polling state 510 to the next standard link training state (e.g., a configuration state 515), the augmented fields of the training sequence may cause the device under test to transition the lane under test to a particular lane under test link state (e.g., 705), while transitioning the remaining lanes to another testing link state (e.g., 710, 715, 720) that supports testing of the lane under test and, in some cases, produces real cross-talk on the lane under test for use in various tests of the lane under test (LUT) conducted by the tester device (e.g., a single lane or multilane BERT).

In some instances, testing link states (e.g., 705, 710, 715, 720) may be based on or incorporate one or more of the standard link states (e.g., an active link state or loopback link state, among other examples). Indeed, in some cases, the tester device may interact with the particular lane to simulate the operation of the receiver/transmitter connected to the particular lane as it would transition from state to state within the standard link state machine. For instance, the tester device may act as the loopback master within a loopback state or may send signals, during the test, as defined in the standard link training machine to cause the lane under test to transition between standard link training states. Even in cases where the LUT test state (e.g., 705) may mimic or include a standard link state, the transition to this link state or sub-state during testing may differ from transitions defined in the standard link training machine. For instance, because the LUT test state 705 only involves a test of a single lane, activities involved in training all of the lanes to enter the state (during typical link training and state machine transitions) may be skipped. For instance, activities such as lane numbering, lane-to-lane deskew, and others may be skipped, which may even allow entire intermediate link training states to be skipped. In other cases, the activities and signaling within a LUT test state 705 and testing link states (e.g., 710, 715, 720) for the remaining lanes (not under test) may be entirely different from states defined in the standard link state machine, in addition to differences in transitioning to these testing link states (e.g., from the polling state 510). For instance, the LUT test state 705 may be dictated entirely by the tester device (e.g., a BERT), with the tester device free to send any variety of signals to simulate various conditions, state transitions, states, etc. as is desirable in connection with a particular test, while the other testing link states (e.g., 710, 715, 720) cause the remaining lanes of the link to inject (or not inject) crosstalk onto the lane under test.

In the example of FIG. 7, some of the testing link states may include states such as shown in the example diagram 700. For instance, one testing link state 710 may be adapted to cause near-end cross-talk (NEXT) to be generated on the lanes under than the lane under test. In another example, a testing link state (e.g., 715) may be adapted to generate only far-end cross-talk (FEXT) (while the transmitters of the receiver/transmitter pairs of the lanes not under test remain quiet). In still another example, a testing link state (e.g., 720) may generate both NEXT and FEXT using the lanes not under test, among other examples. For instance, multiple versions of NEXT (e.g., 710), FEXT-only (e.g., 715), and NEXT/FEXT testing link states (e.g., 720) may be provided and supported by the internal hardware and/or software logic of the device to be tested. For instance, varying types of stress signals may be sent within different testing link states to generate corresponding types of the cross-talk, such as cross-talk of varying severity (e.g., amplitude and frequency), intermittent or continuous cross-talk, among other examples.

Figure 8:
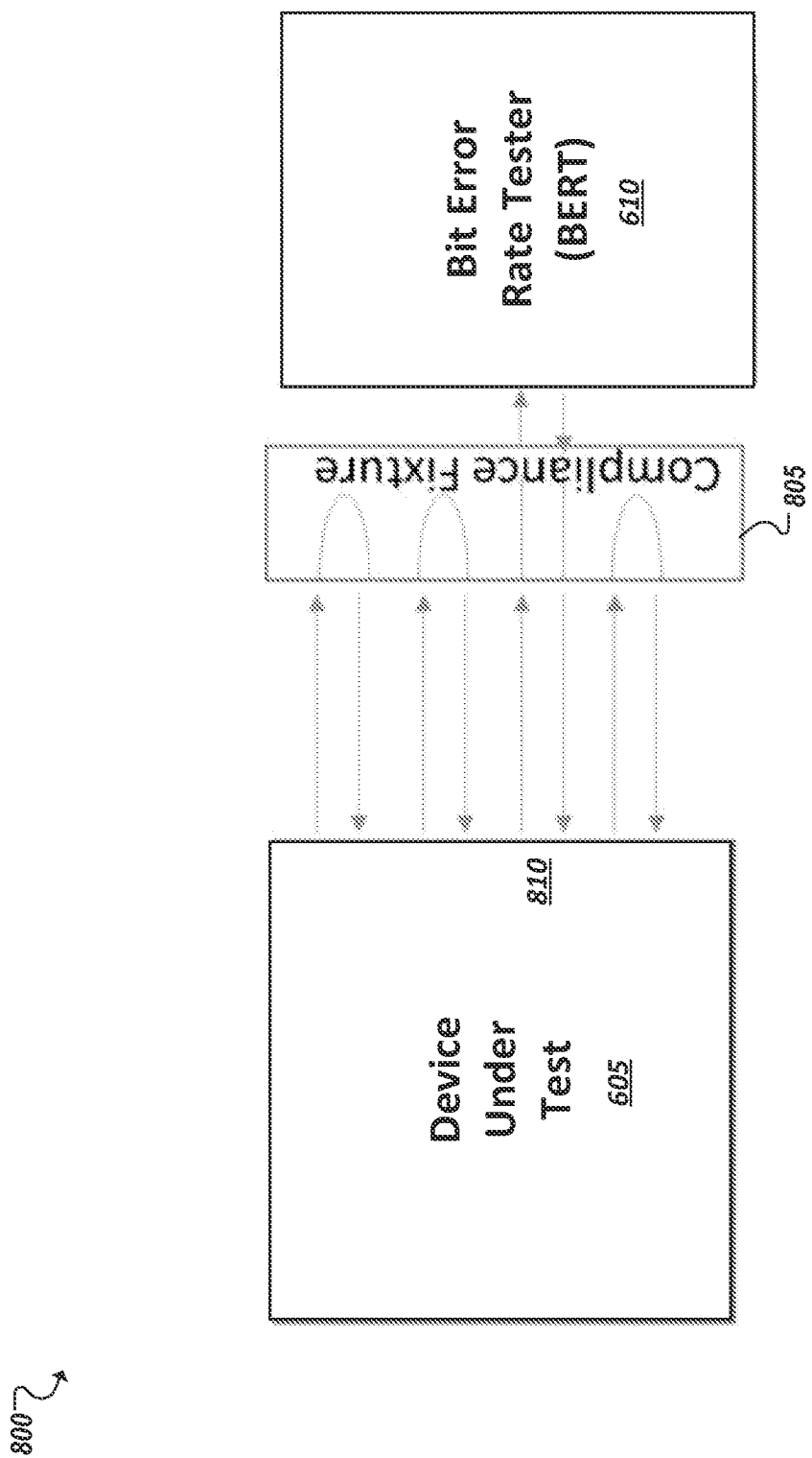
FIG. 8 is a block diagram illustrating an example device connected to a tester device using an example compliance fixture device.

In some instances, to enable some testing link states, additional devices may be provided in connection with a tester device (e.g., 610), such as signal generators (e.g., to generate far-end cross-talk) or, as illustrated in the example block diagram 800 of FIG. 8, a compliance fixture device 805, among other examples. In the example of FIG. 8, a compliance fixture device 805 is provided, which may allow a connection for lanes not under test (i.e., the corresponding receiver/transmitter pairs) in the case of a single lane BERT 610. An example passive compliance fixture device 805 may be used in addition to or in connection with the single-lane BERT 610 to assist in facilitating one or more test modes. In one example, the compliance fixture device 805 may connect to each of the lanes of a link (i.e., including the lane that is to be tested by the BERT 610) and facilitate test modes involving the collection of lanes, as well as enable the tester device 610 to selectively connect to any one of the lanes through a mechanism in the compliance fixture device 805, such as through jumper cables, a dip switch, or other circuitry. A compliance fixture device 805 may thus enable the tester device 610 to connect to any particular lane (e.g., to serially perform single lane tests of each of the lanes of the device under test 605) while connecting the transmitters of each of the remaining lanes of the DUT 605 to another endpoint (e.g., on the compliance fixture 805). Additionally, in some implementations, the compliance fixture 805 may be configured to act in a loopback mode for all lanes other than the lane under test (e.g., 810). In this manner, the compliance fixture 805 may effectively cause the transmitters of each one of the lanes not under test to be connected to the corresponding receivers of the same receiver/transmitter pair to put any (or all) of these other lanes into a self-loopback (such as illustrated in FIG. 8), among other example implementations. In other implementations, the functionality of the example compliance fixture device 805 illustrated in FIG. 8 may be integrated within a multi-lane BERT device or other tester device, among other alternative implementations.

Figure 9A:
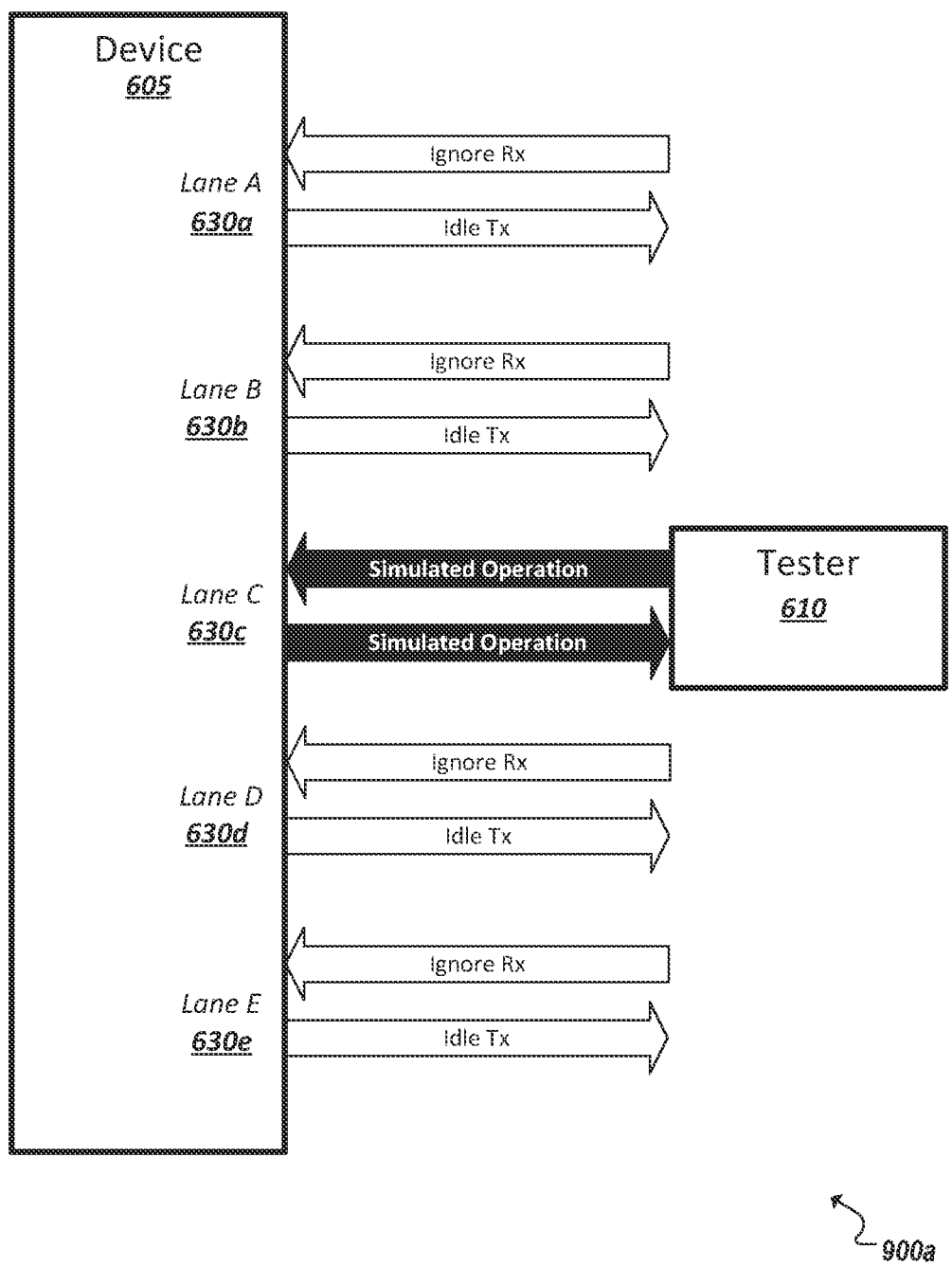
FIGS. 9A-9E are block diagrams illustrating signaling within example testing link states.

Turning to the examples illustrated by the block diagrams 900*a-e* of FIGS. 9A-9E, various testing modes are illustrated utilizing corresponding testing link states supplementing a standard link state machine of an interconnect. For instance, in the example of FIG. 9A, a computing device 605 including receiver/transmitter pairs (and supporting logic) (e.g., 630*a*-630) to implement bi-directional lanes of a multi-lane link may connect to a tester device 610. The tester device may be a standalone tester, such as a BERT used in validation testing, or a tester device implemented on-die or otherwise within the same computing system as the device 605, among other examples. In the example of FIG. 9A, training sequences may be sent in a preceding link state (e.g., a polling link state) to indicate that the device 605 is connected to a tester device and is to enter a particular test mode. In this example test mode, one of the lanes (e.g., 630*c*) is to be tested by the tester device 610 and enter a state in which normal operation of the lane 630*c* is to be simulated in connection with the test. In this example, the lanes not under test (e.g., 630*a,b,d,e*) are to remain quiet (e.g., so as not to generate crosstalk). As the lane under test 630*c* is the only receiver connected to another device (e.g., 610) and receiving the training sequences, only the receiver of receiver/transmitter pair 630*c* receives the training sequence. Test mode support logic may identify the training sequence(s) requesting entry into the particular test mode and may cause both receiver/transmitter pair 630*c* to enter a link under test state and the remaining receiver/transmitter pairs (e.g., 630*a,b,d,e*) to enter another different testing link state in accordance with the identified test mode. In this example, the remaining receiver/transmitter pairs (e.g., 630*a,b,d,e*) are caused to enter a testing link state in which no data is transmitted by the respective transmitters of the receiver/transmitter pairs (e.g., 630*a,b,d,e*) and all signals are to be ignored by the receivers of the remaining receiver/transmitter pairs (e.g., such that the protocol stack logic of the receiver/transmitter pairs (e.g., 630*a,b,d,e*) do not inadvertently interpret noise on their respective lane as a legitimate signal defined according to the protocol stack).

In some implementations, training sequences that are sent from the tester device 610 to the device under test 605 may not only identify that a particular lane is to be tested (e.g., the lane receiving the specialized training sequence), but may explicitly identify a particular one of a set of test modes. For instance, a binary code may be injected in one or more fields of the specialized training sequence (e.g., in an otherwise reserved field in a particular symbol sent in a training sequence within a particular link training state (e.g., a polling state)) to identify a specific one of multiple supported test modes. From this encoding, the device under test 605 may identify map the particular identified test mode to one of a set of testing link states defined in an augmented link state machine and cause the remaining lanes to enter this testing link state in support of the identified test mode. In other implementations, rather than explicitly identifying a defined test mode (e.g., through encodings in a specialized training sequence), the tester device 610 may instead implicitly identify a test mode by providing an encoding to identify the testing link state(s) that the lanes of the device under test 605 are to enter in support of a test requested by the tester device 605. For instance, in one example implementations, the training sequences may identify a LUT testing link state in which the lane under test is to enter and may separately identify one of the supporting testing link states that the remaining lanes (not under test) are to enter. In other implementations, the encoding within the training sequence may identify that a particular lane is to be tested and may only explicitly identify the supporting testing link state that the remaining lanes (not under test) are to enter, among other example implementations. Indeed, it should be appreciated that a variety of different signals (e.g., ordered sets, training sequences, etc.) may be utilized to communicate a request to a device under test to enter a particular test mode. Various encodings including various information and encoded within various symbols, fields, slots, etc. may be adopted in various implementations without departing from the more generalized concepts presented herein.

Figure 9B:
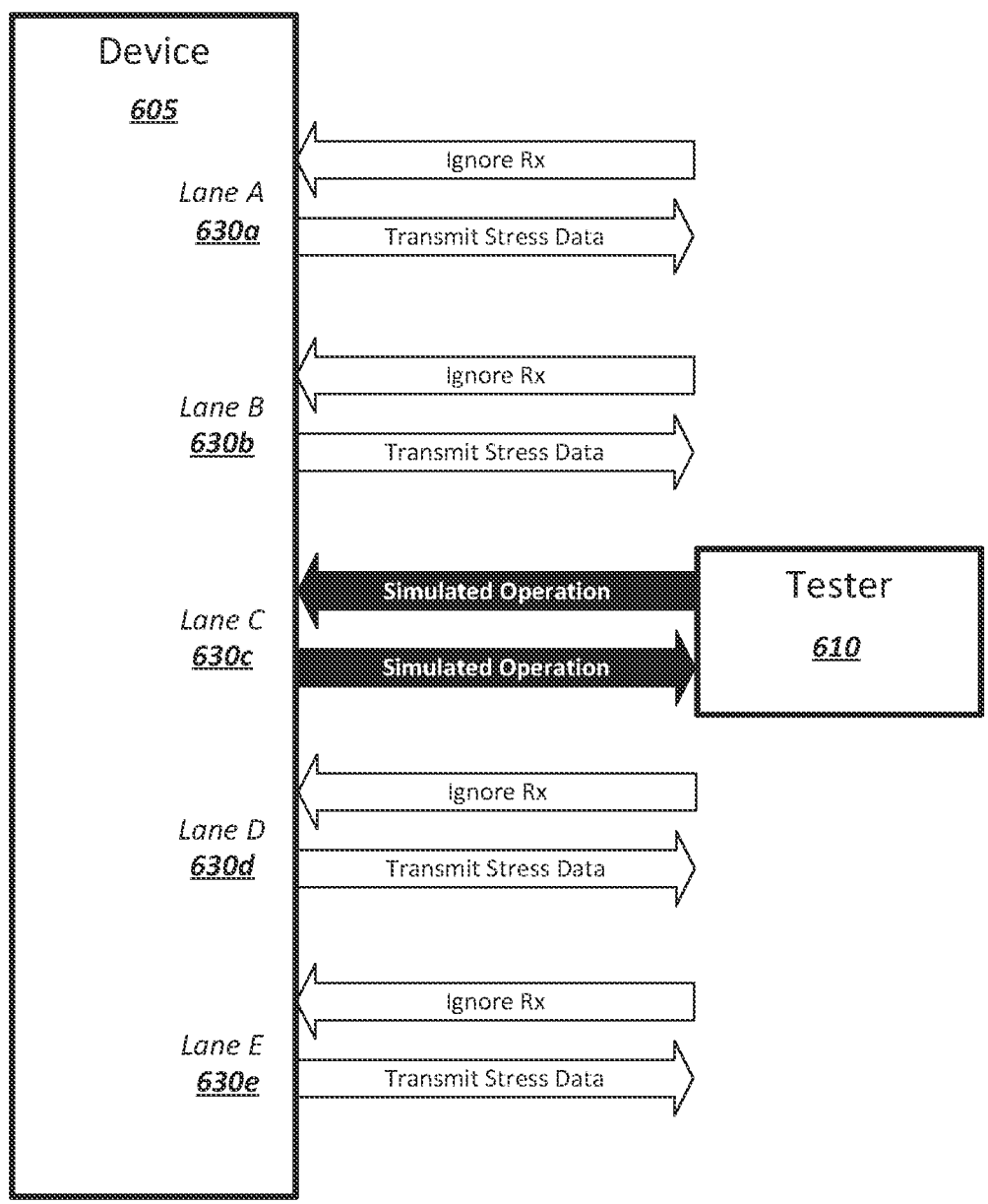

Turning to the example of FIG. 9B, another example test mode is illustrated. As in other examples, such as that illustrated in FIG. 9A, the tester device 610 may send a signal to the receiver of a particular lane (e.g., 630c) that is to be tested and identify (explicitly or implicitly) that a particular test mode (defined or undefined) is to be entered. The receiver of the receiver/transmitter pair of lane 630c may identify, from the signal, that the remaining lanes (e.g., 630a,b,d,e) are to enter a particular one of multiple testing link states in order to support the test requested by the tester device 610. Similarly, in the examples of FIGS. 9C-9E, corresponding signals may be received by the device 605 from the tester device 610 (at the lane under test) to cause the device 605 to transition the remaining lanes (not under test) to a corresponding testing link state (as will be described in more detail in the examples below). In the case of the example of FIG. 9B, the remaining lanes are forced to transition to a testing link state that causes the transmitters of the receiver/transmitter pairs of these remaining lanes to generate near-end crosstalk (NEXT) on the victim lane under test 630c. This may be done by the receiver/transmitter pairs of the remaining lanes transmitting stress data on their transmitters. Further, in this example (as in the example testing state of FIG. 9A), the receivers of these receiver/transmitter pairs may ignore all signals that are received in this testing link state (e.g., to avoid misinterpreting noise that may be received at these receiver/transmitter pairs).

Figure 9C:
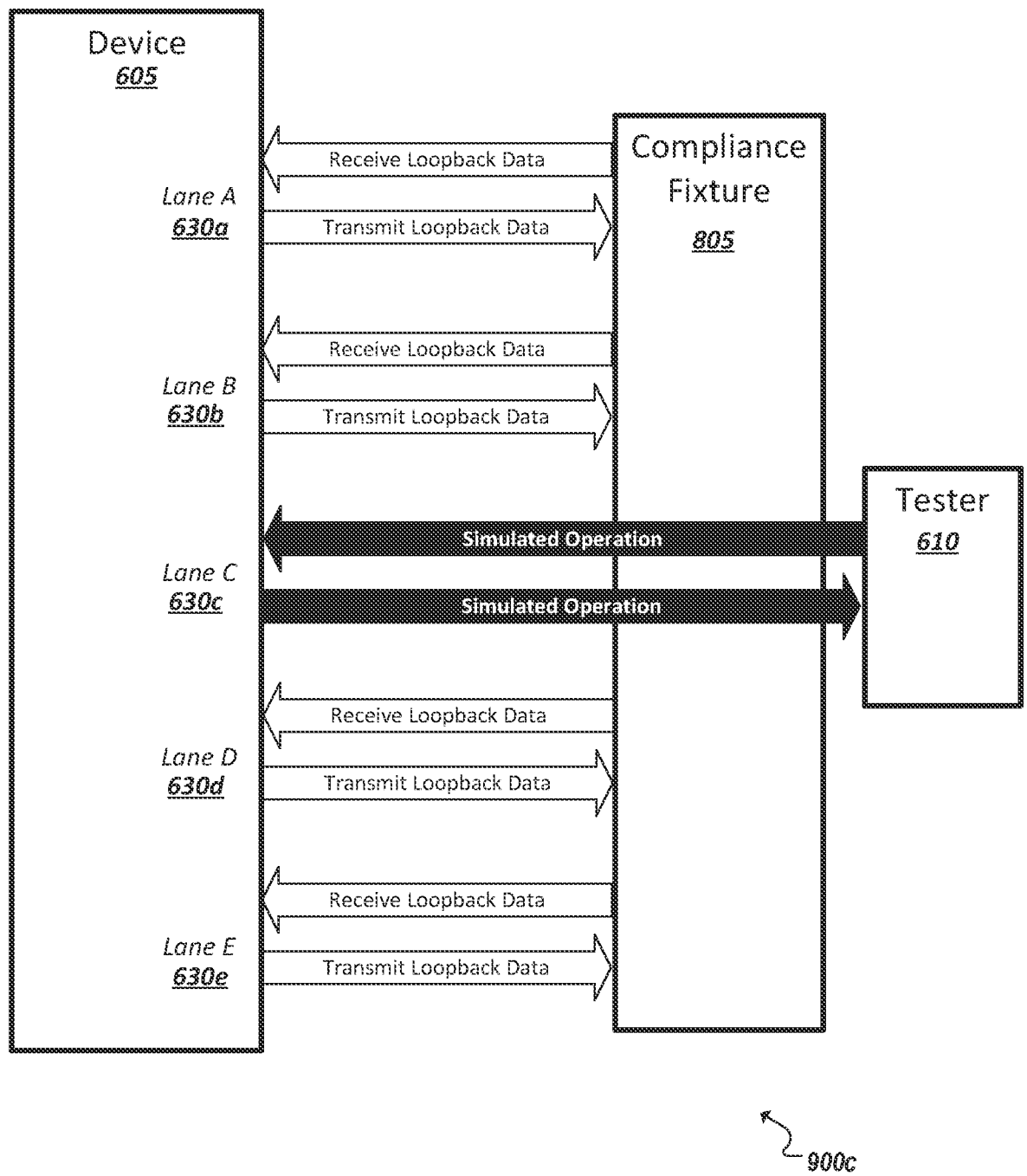

Turning to the example of FIG. 9C, another example testing link state may be provided, which allows both NEXT and FEXT to be generated using the lanes not under test. In one example, such a testing link state may be implemented by looping back stress data generated at the transmitters of the receiver/transmitter pairs of the lanes not under test (e.g., 630a,b,d,e). In the example of FIG. 9C, a compliance fixture device 805 may be utilized to facilitate the looping back of the stress data generated at the transmitters of the receiver/transmitter pairs of the lanes not under test, which causes both NEXT and FEXT to be exhibited on the lane under test. As the testing link states may coexist with the standard link states defined in a link state machine of a protocol (e.g., such that these lanes may later exit the testing link state and transition between standard link states in normal (i.e., non-testing) operation), the risk exists that stress data transmitted to the receivers of the receiver/transmitter pairs of the lanes not under test may be inadvertently match other signals defined within the protocol, which are to prompt some other (e.g., non-testing) action on the part of the protocol stack logic of these receiver/transmitter pairs (e.g., a transition to another (e.g., non-testing) link state, performance of a particular link training function, etc.). Accordingly, within testing link states, in which receivers of the receiver/transmitter pairs of the lanes not under test are to receive stress data, protocol stack logic of these receiver/transmitter pairs may effectively ignore the substance or content of these stress signals while in these testing link states, such that the testing link state is not inadvertently exited or otherwise interrupted.

While the example of FIG. 9C shows the use of a compliance fixture device 805 to facilitate a NEXT/FEXT loopback state, other implementations may use other devices (including the tester device itself, such as in a multi-lane BERT) to facilitate the loopback of the stress data. In this example, the compliance fixture may further act as a retimer, redriver, repeater, or other data forwarding device to simply forward data to and from the lane under test and the single lane tester (e.g., 610). For instance, the compliance fixture may utilizing switching or multiplexing circuitry to identify that the tester is testing a particular one of the lanes (e.g., 630c), such that data forwarding is enabled for this lane, while loopback or transmitting modes are enabled for the remaining lanes of the compliance fixture device (i.e., to connect to the corresponding receivers of the device's 605 receiver/transmitter pairs (e.g., 630a,b,d,e) connected to the lanes not under test.

Figure 9D:
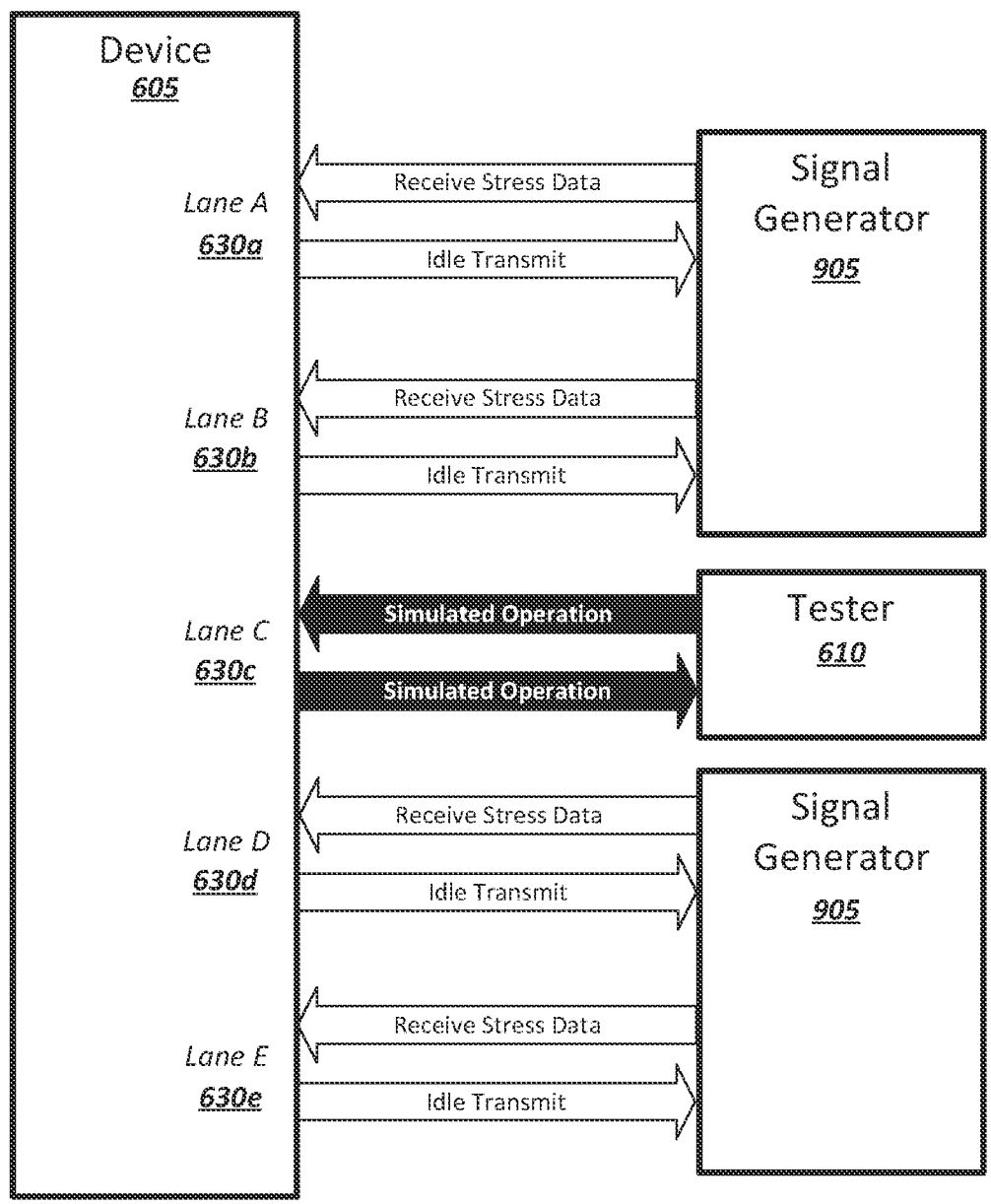

In yet another example, illustrated in FIG. 9D, other testing link states may cause only far-end crosstalk to be generated using the remaining lanes not under test. For instance, stress signals may be generated at another device, such as a signal generator device (e.g., 905), and sent to the receivers of the receiver/transmitter pairs of the lanes not under test (e.g., 630a,b,d,e). In this example testing link state, the transmitters of the receiver/transmitter pairs of the lanes not under test may be placed in an idle mode, such that no data is deliberately transmitted to generate NEXT on the lane under test (e.g., 630c). Additionally, as in the example of FIG. 9C (and other testing link states where lanes not under test are to receive stress data during a test of the lane under test), the receivers of the receiver/transmitter pairs (e.g., 630a,b,d,e) not under test may ignore the stress data generated by the signal generators 905. In some implementations, signal generators (e.g., 905) used in a test of a particular lane (e.g., 630c) may be coupled with and driven by the tester device 610, such that the tester device 610 selects which stress signals are sent by the signal generator(s) (e.g., 905) on which lanes, at which times, and at what intervals (e.g., to achieve specific objectives of the test administered by the tester device (which may be selected, programmed, and otherwise defined using a software interface by a human user or other system)). In other instances, signal generators or other supplemental devices may be additionally used to support other testing link states, such as NEXT/FEXT testing link states where stress data is to be both transmitted and received on lanes not under test by the device 605. In such instances, the signal generator(s) may include receivers to receive (e.g., and effectively ignore and dispose of) stress signals sent from the transmitters of the receiver/transmitter pairs (e.g., 630a,b,d,e) not under test, among other examples.

Figure 9E:
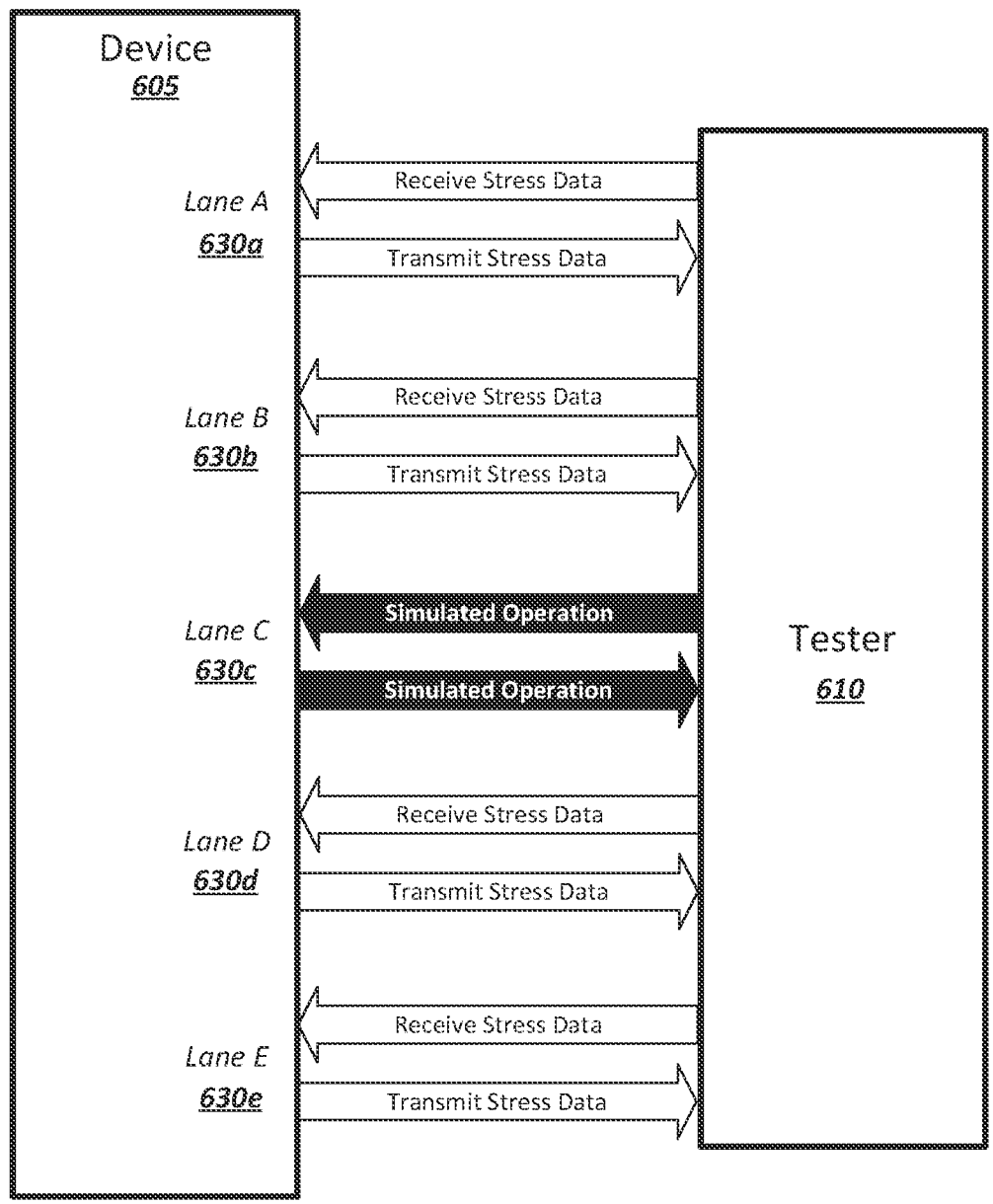

In the examples of FIGS. 9A-9D, a single lane tester device was shown. However, in some implementations, a multi-lane tester device may be provided. Accordingly, additional testing link states may be added and supported by devices (e.g., 605) in addition to testing link states specific to single lane testers. In some cases, such as illustrated in the example of FIG. 9E, the same testing link states used with single lane testers may be used to support testing using multilane testers. Indeed, a multilane tester may simplify the implementation of various test modes (which might otherwise make use of supplemental devices such as compliance fixtures (e.g., 805), signal generators (e.g., 905), etc. For instance, in the example of FIG. 9E, a multilane BERT (e.g., 610) may natively provide the functionality provided by such supplemental devices. For instance, in the example of FIG. 9E, the multi-lane tester device may enable a NEXT/FEXT testing link mode where the tester device receives stress data generated by and transmitted from the transmitters of the lanes not under test on the device 605. In other implementations, the multi-lane tester device 610 may participate in a loopback-based NEXT/FEXT testing link state (e.g., similar to the testing link state illustrated in the example of FIG. 9C). In some cases, the multi-lane tester device may either act as the master or the slave in the loopback-based NEXT/FEXT testing link state, with some testing link states defined to have the transmitters of the device under test generating the stress signals on the non-tested lanes to be looped-back through the tester device, and alternative testing link states defined to have the transmitters of the multi-lane tester generate the stress signals on the non-tested lanes to be looped-back through the corresponding receiver/transmitter pairs of the device under test 605. A multi-lane tester device may also be used in a FEXT-only testing link state to generate the stress signals for delivery to the receivers of the receiver/transmitter pairs of the non-test lanes (e.g., in place of separate, dedicated signal generators (e.g., 905) such as in the example of FIG. 9D), among other example uses.

While the examples of FIGS. 9A-9E each show the same lane (e.g., 630c) serving as the lane under test, it should be appreciated that this is shown merely for ease of illustrating variations between different testing link state examples. Indeed, any one of the multiple lanes (i.e., receiver/transmitter pairs (e.g., 630a-e)) may be connected to a tester device (e.g., a single lane BERT) and be the subject lane-under-test. Further, any one of the multiple lanes, depending on the test, may either enter a LUT testing link state (and be the lane under the test) or enter a supporting testing link state to generate cross talk on the selected lane under test. Accordingly, the protocol stack logic implemented at a respective receiver/transmitter pair (e.g., 630a-e) may support, not only the standard link states defined for the protocol, but also supplemental or added testing link states to allow the lane to be tested as the lane under test or to support the testing of another one of the lanes through the generation of cross-talk on the lane under test.

As introduced above, principles and aspects of a standard link state machine and corresponding logic may be leveraged, in some examples, to facilitate transitions to specialized testing link states, such as those introduced above. As an illustrative example, a tester device, such as a BERT including protocol stack logic to allow the BERT to be at least partially protocol-aware to send and interpret signals defined within a particular protocol supported by a device under test, may guide the device under test through various protocol-defined flows during a test. For instance, within a LUT testing state, the BERT may guide the device under test through an active L0 link state (e.g., skipping a configuration link state), to a Recovery link state (including, in some cases, equalization), through to a Loopback link state, and so on as programmed in accordance with a particular test. In such instances, the BERT may utilized protocol-defined messaging to facilitate these test transitions between the standard link states.

In a more detailed example, and returning to the illustration 700 in FIG. 7, a device that is to have one or more of its receiver/transmitter pairs tested by a tester device may first have each of its receiver/transmitter pairs, corresponding to a multilane link, enter a receiver Detect state 505. All lanes may detect another device (e.g., due to self-Loopback or connection to the BERT or connection to 50 ohm terminations or other test equipment or sources with 50 ohm terminations) in order to progress past the Detect state. In other implementations, the device under test may simply detect an exit from an Electrical Idle state (e.g., in which the device is placed in preparation for the test) due to the tester device driving an electrical pattern to the lane under test. Protocol-defined requirements for this transition may be further relaxed in some implementations to force each of the lanes not connected to a tester device to continue with link training in spite of not detecting a connected receiver on the other end of the lane during a Detect state 505 (e.g., in a case of a NEXT-only testing link state, such as in the example of FIG. 9C).

Continuing with this example, the port that includes the lane under test may exit a Detect state 505 to enter a Polling state 510. In this state, the tester device may send a modified training sequence (e.g., TS1/TS2 Ordered Sets through Polling.Active and Polling.Configuration) with one or more bits set (e.g., in Symbol 5 of the training sequence) to indicate a test mode that is to be entered involving the remaining lanes entering a particular testing link state. In one example, lanes that detect a receiver (during Detect 505) may train (e.g., with their own (looped back) TS1/TS2 Ordered Sets) when not connected to the tester device. In other cases, the lanes not under test may be configured to simply ignore all traffic either at the direction of the link-wide protocol stack logic (based on receiving the training sequence on the BERT-connected lane to indicate that the link is in a test mode) or by default after a certain timeout period (e.g., the timeout based on failing to receive further training data on the lanes not connected to the tester device), among other examples. In some implementations, the Polling itself may be modified to accommodate transitions to the testing link states.

In the example, where a single-lane tester device is used, the modified training sequences indicating a testing mode would be sent only to the receiver of the receiver/transmitter pair to be tested. When the receiver/transmitter pair corresponding to the lane under test receives the modified training sequence(s) (e.g., TS1/TS2 Ordered Sets in a Polling state), the receiver/transmitter pair logic may instruct the device link state machine logic (e.g., LTSSM logic) to transition the lane under test to a LUT link testing state and the remaining lanes to supporting testing link states. In one example, the LUT testing link state may include or mimic an L0 state. Accordingly, in such examples, intermediate states (e.g., a Configuration state 515) that would normally be entered prior to entering the L0 state may be skipped by the link state machine logic. For instance, the Configuration state may be skipped to enter the L0 state (e.g., 520) to begin operation within the LUT testing state (e.g., on receipt of the modified TS2 Ordered Sets with bits set to indicate a corresponding test mode). Aspect of the link that would be trained during the skipped link training states may be set to default values (e.g., the lane number assignment may be the default lane number, among other examples).

Continuing with this example, the LUT testing state (or sequence of steps) may involve driving the lane under test to a Loopback state. Referring to FIG. 5, entering Loopback state 535 may involve first transitioning to a Recovery state 540. In one example implementing a PCIe-based interconnect, if the device under test is a Down Stream Port (DSP), the transition from L0 520 to Recovery 540 with equalization is initiated by the device under test (with bypass mechanisms as defined) at all relevant data rates and the tester device follows. In cases where the device under test is an Up Stream Port (USP), the tester device may initiate the transition from L0 to Recovery with equalization (with bypass mechanisms as defined) at all relevant data rates, with the device under test following. Upon existing the Recovery state 540, the tester device (in a LUT testing state) may initiate the transition to Loopback 535 as Loopback master. The device under test, then, enters Loopback 535 as slave, with Loopback bit set on one Lane. From Loopback-Entry, all Lanes in Slave mode that did not receive the modified TS1/TS2 Ordered Sets during the Polling state 510 may send out a compliance pattern (or modified compliance pattern), among other example implementations. With the lane under test in Loopback, the tester device can then perform measurements on the lane under test and generate results describing the performance of the receiver/transmitter pair on the device under test corresponding to the lane under test.

The foregoing disclosure has presented a number of example testing link states, which may supplement standard link states defined in an interconnect protocol. It should be appreciated that other testing link states may be provided in addition to those identified above without departing from the more generalized principles contained within this disclosure. For instance, while some of the example state machines and ordered sequences discussed herein were described with reference to PCIe or PCIe-based protocols, it should be appreciated that similar, corresponding enhancements may be made to other interconnect protocols, such OpenCAPI', Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 10:
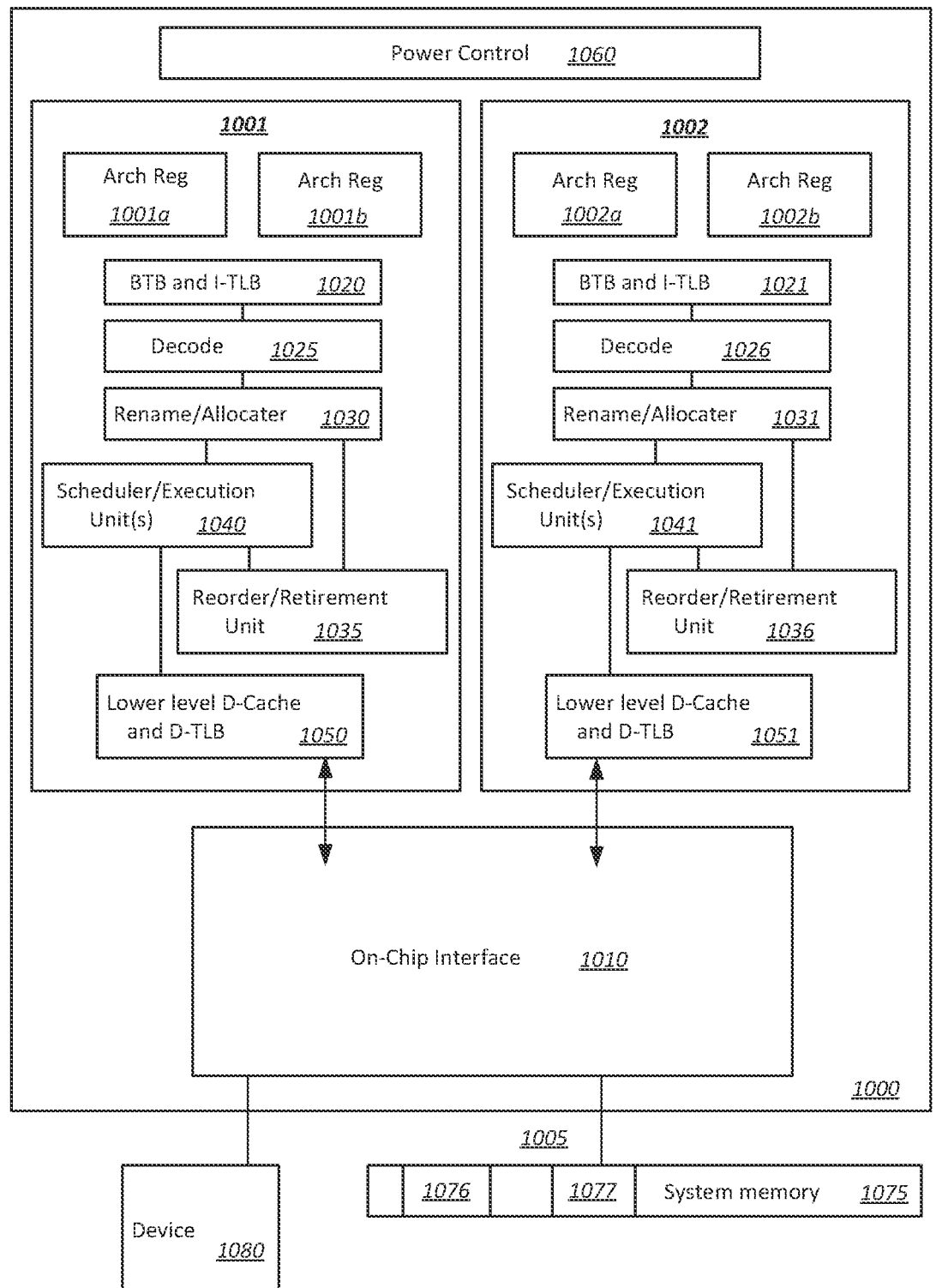
FIG. 10 illustrates an embodiment of a block diagram for a computing system including a multicore processor.

Referring to FIG. 10, an embodiment of a block diagram for a computing system including a multicore processor is depicted. Processor 1000 includes any processor or processing device, such as a microprocessor, an embedded processor, a digital signal processor (DSP), a network processor, a handheld processor, an application processor, a co-processor, a system on a chip (SOC), or other device to execute code. Processor 1000, in one embodiment, includes at least two cores—core 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1000, as illustrated in FIG. 10, includes two cores—core 1001 and 1002. Here, core 1001 and 1002 are considered symmetric cores, i.e. cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1001 are described in further detail below, as the units in core 1002 operate in a similar manner in the depicted embodiment.

As depicted, core 1001 includes two hardware threads 1001a and 1001b, which may also be referred to as hardware thread slots 1001a and 1001b. Therefore, software entities, such as an operating system, in one embodiment potentially view processor 1000 as four separate processors, i.e., four logical processors or processing elements capable of executing four software threads concurrently. As alluded to above, a first thread is associated with architecture state registers 1001a, a second thread is associated with architecture state registers 1001b, a third thread may be associated with architecture state registers 1002a, and a fourth thread may be associated with architecture state registers 1002b. Here, each of the architecture state registers (1301a, 1001b, 1002a, and 1002b) may be referred to as processing elements, thread slots, or thread units, as described above. As illustrated, architecture state registers 1001a are replicated in architecture state registers 1001b, so individual architecture states/contexts are capable of being stored for logical processor 1001a and logical processor 1001b. In core 1001, other smaller resources, such as instruction pointers and renaming logic in allocator and renamer block 1030 may also be replicated for threads 1001a and 1001b. Some resources, such as re-order buffers in reorder/retirement unit 1035, ILTB 1020, load/store buffers, and queues may be shared through partitioning. Other resources, such as general purpose internal registers, page-table base register(s), low-level data-cache and data-TLB 1015, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001a, 1001b, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, as discussed in more detail below decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1026, in one embodiment, recognize the same ISA (or a subset thereof). Alternatively, in a heterogeneous core environment, decoders 1026 recognize a second ISA (either a subset of the first ISA or a distinct ISA).

In one example, allocator and renamer block 1030 includes an allocator to reserve resources, such as register files to store instruction processing results. However, threads 1001a and 1001b are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1050 are coupled to execution unit(s) 1040. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1001 and 1002 share access to higher-level or further-out cache, such as a second level cache associated with on-chip interface 1010. Note that higher-level or further-out refers to cache levels increasing or getting further way from the execution unit(s). In one embodiment, higher-level cache is a last-level data cache—last cache in the memory hierarchy on processor 1000—such as a second or third level data cache. However, higher level cache is not so limited, as it may be associated with or include an instruction cache. A trace cache—a type of instruction cache—instead may be coupled after decoder 1025 to store recently decoded traces. Here, an instruction potentially refers to a macro-instruction (i.e. a general instruction recognized by the decoders), which may decode into a number of micro-instructions (micro-operations).

In the depicted configuration, processor 1000 also includes on-chip interface module 1010. Historically, a memory controller, which is described in more detail below, has been included in a computing system external to processor 1000. In this scenario, on-chip interface 1010 is to communicate with devices external to processor 1000, such as system memory 1075, a chipset (often including a memory controller hub to connect to memory 1075 and an I/O controller hub to connect peripheral devices), a memory controller hub, a northbridge, or other integrated circuit. And in this scenario, bus 1005 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1075 may be dedicated to processor 1000 or shared with other devices in a system. Common examples of types of memory 1075 include DRAM, SRAM, non-volatile memory (NV memory), and other known storage devices. Note that device 1080 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1000. For example in one embodiment, a memory controller hub is on the same package and/or die with processor 1000. Here, a portion of the core (an on-core portion) 1010 includes one or more controller(s) for interfacing with other devices such as memory 1075 or a graphics device 1080. The configuration including an interconnect and controllers for interfacing with such devices is often referred to as an on-core (or un-core configuration). As an example, on-chip interface 1010 includes a ring interconnect for on-chip communication and a high-speed serial point-to-point link 1005 for off-chip communication. Yet, in the SOC environment, even more devices, such as the network interface, co-processors, memory 1075, graphics processor 1080, and any other known computer devices/interface may be integrated on a single die or integrated circuit to provide small form factor with high functionality and low power consumption.

In one embodiment, processor 1000 is capable of executing a compiler, optimization, and/or translator code 1077 to compile, translate, and/or optimize application code 1076 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 11:
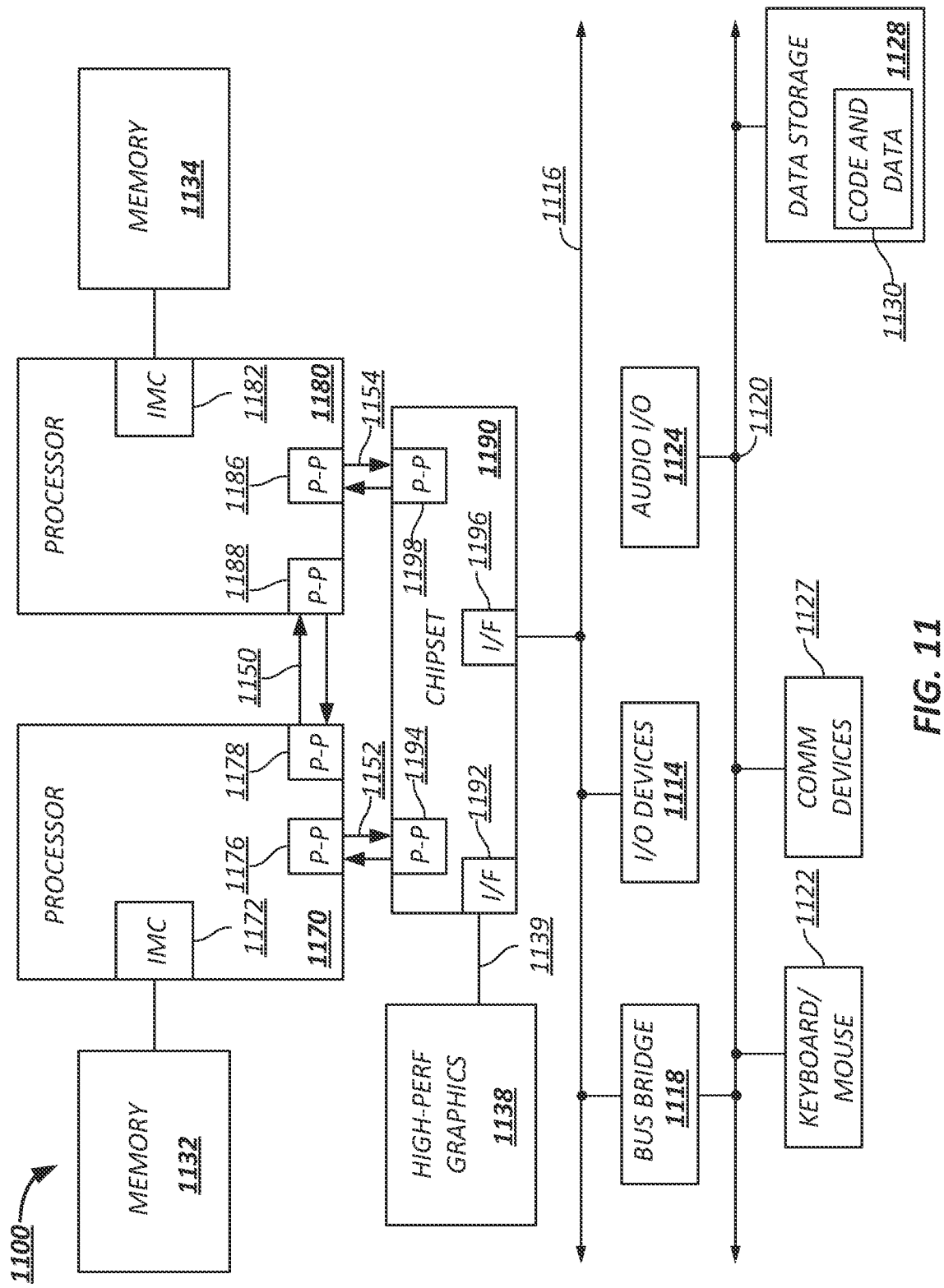
FIG. 11 illustrates an embodiment of a block for a computing system including multiple processors.

Referring now to FIG. 11, shown is a block diagram of another system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as a high-performance architecture. As a result, the invention may be implemented within the QPI architecture.

While shown with only two processors 1170, 1180, it is to be understood that the scope of the present invention is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In some embodiments, an electronic device may be configured to perform one or more processes, techniques, and/or methods as described herein, or portions thereof. One such process is depicted in Figure X-2. For example, the process may include performing, by a first and second retimer, an SKP adjustment during a first SKP ordered set (OS); and performing, by a third and fourth retimer, an SKP adjustment during a second SKP OS.

In some embodiments, an electronic device may be configured to perform one or more processes, techniques, and/or methods as described herein, or portions thereof. For example, the process may include enhancing a training ordered set (OS) to allow for five generations of speeds; and setting a configuration register to indicate a Gen 5 PCIe speed.

In some embodiments, an electronic device may be configured to perform one or more processes, techniques, and/or methods as described herein, or portions thereof. For example, the process may include identifying a channel type provided by a platform; identifying a presence of one or more retimers; and choosing, based on the channel type and whether one or more retimers are present, between 25 Gigatransfers per second (GT/s) and 32 GT/s.

In some embodiments, an electronic device may be configured to perform one or more processes, techniques, and/or methods as described herein, or portions thereof. For example, the process may include identifying a channel link width from a set that includes widths of ×20,×24, ×28, and ×28; and communicating over a channel link based on the identified channel link width.

In some embodiments, an electronic device may be configured to perform one or more processes, techniques, and/or methods as described herein, or portions thereof. For example, the process may include identifying recovered clock data from clock data recovery (CDR); and transmitting, based on the recovered clock data, transmit (TX) data after an initial training.

In some embodiments, a method of communicating in accordance with a PCIe standard may be provided that includes performing, by a first and second retimer, an SKP adjustment during a first SKP ordered set (OS), and performing, by a third and fourth retimer, an SKP adjustment during a second SKP OS. The method can further include reducing a SKP OS frequency by half. In some cases, the first SKP OS may be sent back-to-back with the second SKP OS. The method may further include enhancing a training ordered set (OS) to allow for five generations of speeds, and setting a configuration register to indicate a Gen 5 PCIe speed. Further, a channel type provided by a platform may be identified, the presence of one or more retimers may be identified, and the channel speed may be selected (e.g., from either 25 Gigatransfers per second (GT/s) or 32 GT/s) based on the channel type and whether one or more retimers are present. This selection may also be determined based on whether forward error correction (FEC) is enabled or supported. This speed selection may take place during link training. These example methods may additional include identifying a channel link width from a set that includes widths of ×20, ×24, ×28, and ×28, and communicating over a channel link based on the identified channel link width. Further, recovered clock data from a clock data recovery component may be identified, and transmit data may be sent based on the recovered clock data following training of the link.

In some embodiments, an apparatus may be provided to communicate in accordance with a PCIe-based standard, the apparatus including an extended continuous time linear equalizer (CTLE), and/or minimum 8-tap decision feedback equalizer (DFE), and/or a T-coil or Pi-coil termination, and/or a data pattern filter related to clock data recovery (CDR), and/or a 4-way interleaved clock architecture, among other example features and components.

In some embodiments, an apparatus may be provided to communicate in accordance with a peripheral component interconnect express (PCIe) standard with channel loss characteristics, such as discussed above. The PCIe standard may be a Gen 5 (or higher) PCIe standard.

The following examples pertain to embodiments in accordance with this Specification. Example 1 is an apparatus including: an interface including a port, where the port includes a plurality of receiver-transmitter pairs, and each of the receiver-transmitter pairs includes: a respective receiver to receive data on a respective one of a plurality of bidirectional lanes; and a respective transmitter to transmit data on the respective lane; and state machine logic including hardware circuitry. The state machine logic is to: detect a training sequence received by a particular receiver of a particular one of the plurality of receiver-transmitter pairs on a particular one of the plurality of bidirectional lanes from a tester device, where the training sequence includes a value to indicate a test of the particular receiver-transmitter pair by the tester device; cause the particular receiver-transmitter pair to transition to a first link state in association with the test; and cause another one of the plurality of receiver-transmitter pairs to enter a second link state different from the first link state in association with the test.

Example 2 may include the subject matter of example 1, where the value indicates a particular one of a plurality of test modes to be applied in the test of the particular receiver-transmitter pair, the second link state corresponds to the particular test mode, and the other receiver-transmitter pair enters the second link state based on the particular test mode.

Example 3 may include the subject matter of example 2, where the plurality of test modes include at least a first test mode to test lanes in presence of far-end crosstalk and at least a second test mode to test lanes in presence of near-end cross talk.

Example 4 may include the subject matter of example 3, where the particular test mode includes the first test mode, the transmitter of the other receiver-transmitter pair is to remain idle in the first link state, the receiver of the other receiver-transmitter pair is to receive a stress signal in the first link state, the stress signal is to cause crosstalk on the particular lane, and the other receiver-transmitter pair is to ignore content of the received stress signal.

Example 5 may include the subject matter of example 3, where the particular test mode includes the second test mode, and the transmitter of the other receiver-transmitter pair is to transmit a signal in the second link state to cause crosstalk on the particular lane.

Example 6 may include the subject matter of example 5, where the signal includes a first stress signal, the second test mode is to test lanes in the presence of both near-end and far-end cross talk, the receiver of the other receiver-transmitter pair is to receive a second stress signal in the second link state, the first stress signal is to cause the near-end crosstalk on the particular lane, the second stress signal is to cause the far-end crosstalk on the particular lane, and the other receiver-transmitter pair is to ignore content of the received second stress signal.

Example 7 may include the subject matter of example 3, where the second stress signal includes a looped-back version of the first stress signal.

Example 8 may include the subject matter of any one of examples 1-7, where the first link state includes a loopback state, the tester device is to be the master in the loopback state.

Example 9 may include the subject matter of any one of examples 1-8, where the training sequence is received during a polling link state.

Example 10 may include the subject matter of example 9, where the polling link state includes a link training state in a state machine compatible with a Peripheral Component Interconnect Express (PCIe)-based protocol.

Example 11 may include the subject matter of example 9, where the particular receiver-transmitter pair transitions to the first link state and the other receiver-transmitter pair transitions to the second link state both from the polling link state.

Example 12 may include the subject matter of any one of examples 1-11, where the tester device includes a bit error rate tester (BERT) device.

Example 13 may include the subject matter of example 12, where the BERT device includes a single lane BERT device to connect to only one of the plurality of receiver-transmitter pairs during tests of the device.

Example 14 may include the subject matter of example 12, where the BERT device includes a multi-lane BERT device to connect to each one of the plurality of receiver-transmitter pairs during tests of the device.

Example 15 may include the subject matter of any one of examples 1-14, where the second link state includes one of a plurality of testing states supported by the state machine logic.

Example 16 may include the subject matter of example 15, where the plurality of testing states are separate from states in a link state machine adapted to bring a link to a standard active state.

Example 17 may include the subject matter of example 16, where the standard active state includes an L0 state.

Example 18 may include the subject matter of any one of examples 1-17, where all of the receiver-transmitter pairs in the plurality of receiver-transmitter pairs other than the particular receiver-transmitter pair are to enter the second state for the test.

Example 19 may include the subject matter of example 1, where data is to be transmitted from the testing device on the particular lane in the first link state, and the second state includes one of: an idle state where no data is transmitted by the other receiver-transmitter pair on another one of the plurality of lanes, a loopback state where data is transmitted continuously from the transmitter of the other receiver-transmitter pair on the other lane to another device during the particular test mode and looped back to the receiver of the other receiver-transmitter pair; and a transmit only state where data is transmitted continuously by the transmitter of the other receiver-transmitter pair on the other lane and signals are ignored by the receiver of the other receiver-transmitter pair on the other lane during the particular test mode.

Example 20 may include the subject matter of example 19, where data transmitted by the transmitter of the other receiver-transmitter pair is to be used to test for near-end cross-talk on the particular lane and data transmitted from another device to the receiver of the other receiver-transmitter pair is to be used to test for near-end cross-talk on the particular lane.

Example 21 is a method including: receiving a training sequence at a receiver of a particular one of a plurality of receiver-transmitter pairs, where each of the plurality of receiver-transmitter pairs is to implement a respective one of a plurality of lanes in a link, the training sequence is received from a tester device on a particular one of the plurality of lanes, and the training sequence includes a value to indicate a test of the particular receiver-transmitter pair by the tester device; transitioning the particular receiver-transmitter pair to a first link state in association with the test; and transitioning one or more other receiver-transmitter pairs in the plurality of receiver-transmitter pairs to enter a second link state different from the first link state in association with the test, where the second link state enables crosstalk to be produced on the particular lane during the test.

Example 22 may include the subject matter of example 21, where the value indicates a particular one of a plurality of test modes to be applied in the test of the particular receiver-transmitter pair, the second link state corresponds to the particular test mode, and the other receiver-transmitter pair enters the second link state based on the particular test mode.

Example 23 may include the subject matter of example 22, where the plurality of test modes include at least a first test mode to test lanes in presence of far-end crosstalk and at least a second test mode to test lanes in presence of near-end cross talk.

Example 24 may include the subject matter of example 23, where the particular test mode includes the first test mode, the transmitter of the other receiver-transmitter pair is to remain idle in the first link state, the receiver of the other receiver-transmitter pair is to receive a stress signal in the first link state, the stress signal is to cause crosstalk on the particular lane, and the other receiver-transmitter pair is to ignore content of the received stress signal.

Example 25 may include the subject matter of example 23, where the particular test mode includes the second test mode, and the transmitter of the other receiver-transmitter pair is to transmit a signal in the second link state to cause crosstalk on the particular lane.

Example 26 may include the subject matter of example 25, where the signal includes a first stress signal, the second test mode is to test lanes in the presence of both near-end and far-end cross talk, the receiver of the other receiver-transmitter pair is to receive a second stress signal in the second link state, the first stress signal is to cause the near-end crosstalk on the particular lane, the second stress signal is to cause the far-end crosstalk on the particular lane, and the other receiver-transmitter pair is to ignore content of the received second stress signal.

Example 27 may include the subject matter of example 23, where the second stress signal includes a looped-back version of the first stress signal.

Example 28 may include the subject matter of any one of examples 21-27, where the first link state includes a loopback state, the tester device is to be the master in the loopback state.

Example 29 may include the subject matter of any one of examples 21-28, where the training sequence is received during a polling link state.

Example 30 may include the subject matter of example 29, where the polling link state includes a link training state in a state machine compatible with a Peripheral Component Interconnect Express (PCIe)-based protocol.

Example 31 may include the subject matter of example 29, where the particular receiver-transmitter pair transitions to the first link state and the other receiver-transmitter pair transitions to the second link state both from the polling link state.

Example 32 may include the subject matter of any one of examples 21-31, where the tester device includes a bit error rate tester (BERT) device.

Example 33 may include the subject matter of example 32, where the BERT device includes a single lane BERT device to connect to only one of the plurality of receiver-transmitter pairs during tests of the device.

Example 34 may include the subject matter of example 32, where the BERT device includes a multi-lane BERT device to connect to each one of the plurality of receiver-transmitter pairs during tests of the device.

Example 35 may include the subject matter of any one of examples 21-34, where the second link state includes one of a plurality of testing states supported by the state machine logic.

Example 36 may include the subject matter of example 35, where the plurality of testing states are separate from states in a link state machine adapted to bring a link to a standard active state.

Example 37 may include the subject matter of example 36, where the standard active state includes an L0 state.

Example 38 may include the subject matter of any one of examples 21-37, where all of the receiver-transmitter pairs in the plurality of receiver-transmitter pairs other than the particular receiver-transmitter pair are to enter the second state for the test.

Example 39 may include the subject matter of example 21, where data is to be transmitted from the testing device on the particular lane in the first link state, and the second state includes one of: an idle state where no data is transmitted by the other receiver-transmitter pair on another one of the plurality of lanes; a loopback state where data is transmitted continuously from the transmitter of the other receiver-transmitter pair on the other lane to another device during the particular test mode and looped back to the receiver of the other receiver-transmitter pair; and a transmit only state where data is transmitted continuously by the transmitter of the other receiver-transmitter pair on the other lane and signals are ignored by the receiver of the other receiver-transmitter pair on the other lane during the particular test mode.

Example 40 may include the subject matter of example 39, where data transmitted by the transmitter of the other receiver-transmitter pair is to be used to test for near-end cross-talk on the particular lane and data transmitted from another device to the receiver of the other receiver-transmitter pair is to be used to test for near-end cross-talk on the particular lane.

Example 41 is a system including means to perform the method of any one of examples 21-40.

Example 42 may include the subject matter of example 41, where the means include a computer readable-medium storing instruction executable to perform at least a portion of the method of any one of examples 21-40.

Example 43 is a system including: a device including: one or more processor cores; a port including a plurality of receiver-transmitter pairs, and each of the receiver-transmitter pairs includes a respective receiver and transmitters and is to connect to a respective one of a plurality of bidirectional lanes; and state machine logic including hardware circuitry. The state machine logic is to: detect a training sequence received by a particular receiver of a particular one of the plurality of receiver-transmitter pairs on a particular one of the plurality of bidirectional lanes from a tester device, where the training sequence includes a value to indicate a test of the particular receiver-transmitter pair by the tester device; cause the particular receiver-transmitter pair to transition to a first link state in association with the test; and cause another one or more other receiver-transmitter pairs in the plurality of receiver-transmitter pairs to enter a second link state different from the first link state in association with the test.

Example 44 may include the subject matter of example 43, further including the tester device, where the tester generates test results from the test.

Example 45 may include the subject matter of example 44, where the tester device includes a bit-error rate tester (BERT) device.

Example 46 may include the subject matter of example 45, where the BERT device includes a single lane BERT device to connect to only one of the plurality of receiver-transmitter pairs during tests of the device.

Example 47 may include the subject matter of example 45, where the BERT device includes a multi-lane BERT device to connect to each one of the plurality of receiver-transmitter pairs during tests of the device.

Example 48 may include the subject matter of example 44, where the device includes the tester device.

Example 49 may include the subject matter of example 43, further including a compliance fixture device to: connect to each one of the plurality of receiver-transmitter pairs using the plurality of lanes; forward data between the particular receiver-transmitter pair and the tester device; and loopback data received from transmitters of the one or more other receiver/transmitter states in the second link state to cause both near-end and far-end crosstalk to be produced on the particular lane during the test.

Example 50 may include the subject matter of example 43, where the value indicates a particular one of a plurality of test modes to be applied in the test of the particular receiver-transmitter pair, the second link state corresponds to the particular test mode, and the other receiver-transmitter pair enters the second link state based on the particular test mode.

Example 51 may include the subject matter of example 50, where the plurality of test modes include at least a first test mode to test lanes in presence of far-end crosstalk and at least a second test mode to test lanes in presence of near-end cross talk.

Example 52 may include the subject matter of example 51, where the particular test mode includes the first test mode, the transmitter of the other receiver-transmitter pair is to remain idle in the first link state, the receiver of the other receiver-transmitter pair is to receive a stress signal in the first link state, the stress signal is to cause crosstalk on the particular lane, and the other receiver-transmitter pair is to ignore content of the received stress signal.

Example 53 may include the subject matter of example 51, where the particular test mode includes the second test mode, and the transmitter of the other receiver-transmitter pair is to transmit a signal in the second link state to cause crosstalk on the particular lane.

Example 54 may include the subject matter of example 53, where the signal includes a first stress signal, the second test mode is to test lanes in the presence of both near-end and far-end cross talk, the receiver of the other receiver-transmitter pair is to receive a second stress signal in the second link state, the first stress signal is to cause the near-end crosstalk on the particular lane, the second stress signal is to cause the far-end crosstalk on the particular lane, and the other receiver-transmitter pair is to ignore content of the received second stress signal.

Example 55 may include the subject matter of example 51, where the second stress signal includes a looped-back version of the first stress signal.

Example 56 may include the subject matter of any one of examples 43-55, where the first link state includes a loopback state, the tester device is to be the master in the loopback state.

Example 57 may include the subject matter of any one of examples 43-56, where the training sequence is received during a polling link state.

Example 58 may include the subject matter of example 57, where the polling link state includes a link training state in a state machine compatible with a Peripheral Component Interconnect Express (PCIe)-based protocol.

Example 59 may include the subject matter of example 57, where the particular receiver-transmitter pair transitions to the first link state and the other receiver-transmitter pair transitions to the second link state both from the polling link state.

Example 60 may include the subject matter of any one of examples 43-59, where the second link state includes one of a plurality of testing states supported by the state machine logic.

Example 61 may include the subject matter of example 60, where the plurality of testing states are separate from states in a link state machine adapted to bring a link to a standard active state.

Example 62 may include the subject matter of example 61, where the standard active state includes an L0 state.

Example 63 may include the subject matter of any one of examples 43-62, where all of the receiver-transmitter pairs in the plurality of receiver-transmitter pairs other than the particular receiver-transmitter pair are to enter the second state for the test.

Example 64 may include the subject matter of example 63, where data is to be transmitted from the testing device on the particular lane in the first link state, and the second state includes one of: an idle state where no data is transmitted by the other receiver-transmitter pair on another one of the plurality of lanes; a loopback state where data is transmitted continuously from the transmitter of the other receiver-transmitter pair on the other lane to another device during the particular test mode and looped back to the receiver of the other receiver-transmitter pair; and a transmit only state where data is transmitted continuously by the transmitter of the other receiver-transmitter pair on the other lane and signals are ignored by the receiver of the other receiver-transmitter pair on the other lane during the particular test mode.

Example 65 may include the subject matter of example 64, where data transmitted by the transmitter of the other receiver-transmitter pair is to be used to test for near-end cross-talk on the particular lane and data transmitted from another device to the receiver of the other receiver-transmitter pair is to be used to test for near-end cross-talk on the particular lane.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a port comprising:
      a plurality of receiver-transmitter pairs, wherein each of the receiver-transmitter pairs in the plurality of receiver-transmitter pairs is to send and receive data on a corresponding one of a plurality of lanes of a link;
      protocol circuitry to:
         detect a training sequence received from a tester device at one of the receiver-transmitter pairs associated with a particular one of the plurality of lanes, wherein the training sequence identifies a test of the particular lane by the tester device, and a subset of the plurality of lanes are not under test, wherein the subset of lanes are to connect the port to another device;
         send a compliance pattern on a subset of the plurality of receiver-transmitter pairs associated with the subset of lanes based on the test, to generate cross-talk on the particular lane during the test; and
         communicate data on the particular lane based on the test.

2. The apparatus of claim 1 wherein the other device comprises a compliance fixture.

3. The apparatus of claim 1, wherein the compliance pattern is looped back by the other device on one of the subset of receiver-transmitter pairs.

4. The apparatus of claim 3, wherein near-end cross-talk (NEXT) is generated on the particular lane by the subset of receiver-transmitter pairs through the sending of the compliance pattern, and far-end cross-talk (FEXT) is generated on the particular lane through the looping-back of the compliance pattern by the other device.

5. The apparatus of claim 1, wherein the compliance pattern is defined in a Peripheral Component Interconnect Express (PCIe)-based protocol.

6. The apparatus of claim 1, wherein the protocol circuitry is to:
   enter a receiver detect state for the link;
   transition from the receiver detect state to a polling state, wherein the training sequence is received from the tester device in the polling state; and
   transition to a loopback state, wherein the test is to be performed in the loopback state.

7. The apparatus of claim 6, wherein the subset of receiver-transmitter pairs are to be trained through self-looped-back training sequences.

8. The apparatus of claim 1, wherein the training sequence comprises one of a PCIe TS1 ordered set or a PCIe TS2 ordered set.

9. The apparatus of claim 1, wherein the test is performed after completion of an equalization flow to bring the data rate of the link to 32.0 GT/s.

10. The apparatus of claim 1, wherein the tester device comprises a single lane bit error rate tester (BERT).

11. The apparatus of claim 1, wherein the particular lane comprises a lane other than Lane 0 within the plurality of lanes.

12. A method comprising:
  entering a polling state of a link training and status state machine (LTSSM) during a training of a link, wherein the link comprises a plurality of lanes, and a particular one of the plurality of lanes is coupled to a tester device;
  receiving a training sequence on the particular lane during the polling state from the tester device;
  determining a test of the particular lane by the tester device based on a value in the training sequence received on the particular lane; and
  sending a compliance pattern on a subset of the plurality of lanes other than the particular lane based on the test, wherein sending the compliance pattern on the subset of lanes causes cross-talk to be generated on the particular lane during the test.

13. The method of claim 12, further comprising performing the test using the cross-talk generated on the subset of lanes.

14. The method of claim 12, wherein the cross-talk comprises near-end cross-talk.

15. The method of claim 14, wherein the cross-talk further comprises far-end cross-talk by looping back the compliance pattern on the subset of lanes.

16. The method of claim 12, wherein the training is based on a PCIe-based protocol.

17. A system comprising:
  a single lane bit error rate tester (BERT) device;
  a compliance fixture device; and
  a particular device comprising a port, wherein the port is to couple to other devices via a plurality of physical lanes, and the port comprises state machine circuitry to:
    detect a training sequence received from the BERT device on a particular one of the plurality of lanes, wherein the training sequence identifies a test of the particular lane by the BERT device, and a subset of the plurality of lanes are connected to the compliance fixture device and not the BERT device;
    cause a compliance pattern to be sent on the subset of lanes based on the test, wherein sending of the compliance pattern on the subset of lanes causes cross-talk to be generated to affect the particular lane during the test; and
    communicate data on the particular lane based on the test.

18. The system of claim 17, wherein the cross-talk comprises one of near-end cross-talk or far-end cross-talk.

19. The system of claim 17, wherein the port is configured to implement a PCIe Gen 5 link.

* * * * *